US006777064B1

(12) United States Patent
Brown et al.

(10) Patent No.: US 6,777,064 B1
(45) Date of Patent: *Aug. 17, 2004

(54) CLEANING SHEETS, IMPLEMENTS, AND ARTICLES USEFUL FOR REMOVING ALLERGENS FROM SURFACES AND METHODS OF PROMOTING THE SALE THEREOF

(75) Inventors: Laura Krebs Brown, Maineville, OH (US); Jennifer Lee Counts, Milford, OH (US); David Charles Bernens, Cincinnati, OH (US); Paul Joseph Russo, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,592

(22) Filed: Oct. 1, 1999

Related U.S. Application Data

(63) Continuation-in-part of application No. 09/082,349, filed on May 20, 1998, now Pat. No. 6,645,604.
(60) Provisional application No. 60/055,330, filed on Aug. 12, 1997, and provisional application No. 60/047,619, filed on May 23, 1997.

(51) Int. Cl.[7] .............................. B32B 3/00; D04H 1/46
(52) U.S. Cl. ...................... 428/171; 428/172; 428/218; 428/219; 15/208; 15/209.1; 15/244.1; 15/244.2; 15/244.3; 442/93; 442/408
(58) Field of Search .................................. 428/171, 172, 428/218, 219; 15/208, 209.1, 244.1, 244.2, 244.3; 442/93, 408

(56) References Cited

U.S. PATENT DOCUMENTS

| | | | |
|---|---|---|---|
| 3,025,199 A | 3/1962 | Harwood | 154/46 |
| 3,494,821 A | 2/1970 | Evans | 161/169 |
| 3,616,157 A | 10/1971 | Smith | 161/124 |
| 3,629,047 A | 12/1971 | Davison | 161/57 |
| 3,695,985 A | 10/1972 | Brock et al. | 161/129 |
| 3,755,062 A | 8/1973 | Schirmer | 161/146 |
| 3,775,231 A | 11/1973 | Thomas | 161/57 |
| 3,794,537 A | 2/1974 | Rahmes | 156/62.8 |
| 3,965,518 A | 6/1976 | Muoio | 15/104.93 |
| 3,965,519 A | 6/1976 | Hermann | 15/104.93 |

(List continued on next page.)

FOREIGN PATENT DOCUMENTS

| | | | | |
|---|---|---|---|---|
| CA | 1189296 | 6/1985 | ............ | D04H/1/00 |
| CA | 2013790 | 11/1990 | ............ | D04H/1/58 |
| CA | 2016288 | 11/1990 | ............ | D04H/3/02 |

(List continued on next page.)

*Primary Examiner*—Ula C. Ruddock
(74) *Attorney, Agent, or Firm*—Thibault Fayette; Jason J. Camp; Kim William Zerby

(57) ABSTRACT

An article of manufacture useful for removing allergens from surfaces comprises (a) a package; (b) cleaning sheet capable of removing allergens from surfaces; and (c) information to communicate the allergen removal ability of the cleaning sheet to consumers. A method of promoting the sale of cleaning sheets useful for removing allergens from surfaces comprises a variety of steps to inform a consumer of the allergen removal ability of the present cleaning sheets, implements, and articles and encourage the consumer to use them to remove allergens from a surface.

17 Claims, 7 Drawing Sheets

U.S. PATENT DOCUMENTS

| | | | | |
|---|---|---|---|---|
| 4,001,472 A | | 1/1977 | Thomas et al. | 428/109 |
| 4,064,061 A | * | 12/1977 | Henry | 252/91 |
| 4,097,638 A | | 6/1978 | Videen | 428/213 |
| 4,144,370 A | | 3/1979 | Boulton | 428/233 |
| 4,207,367 A | | 6/1980 | Baker, Jr. | 428/171 |
| 4,239,792 A | | 12/1980 | Ludwa | 428/198 |
| 4,426,417 A | | 1/1984 | Meitner et al. | |
| 4,436,780 A | | 3/1984 | Hotchkiss et al. | 428/198 |
| 4,522,863 A | | 6/1985 | Keck et al. | 428/196 |
| 4,600,620 A | | 7/1986 | Lloyd et al. | 428/195 |
| 4,634,621 A | | 1/1987 | Manning et al. | 428/110 |
| 4,636,429 A | | 1/1987 | Morell et al. | 428/288 |
| 4,637,949 A | | 1/1987 | Manning et al. | 428/110 |
| 4,666,621 A | * | 5/1987 | Clark et al. | 252/91 |
| 4,683,001 A | | 7/1987 | Floyd et al. | 106/3 |
| 4,704,321 A | | 11/1987 | Zafiroglu | 428/230 |
| 4,731,276 A | | 3/1988 | Manning et al. | 428/110 |
| 4,773,238 A | | 9/1988 | Zafiroglu | 66/192 |
| 4,808,467 A | | 2/1989 | Suskind et al. | 428/284 |
| 4,820,579 A | | 4/1989 | Aszman | 428/304.4 |
| 4,946,617 A | | 8/1990 | Sheridan et al. | 252/91 |
| 4,987,632 A | | 1/1991 | Rowe et al. | 15/104.93 |
| 5,093,190 A | | 3/1992 | Kwok et al. | 428/288 |
| 5,144,729 A | | 9/1992 | Austin et al. | 28/105 |
| 5,165,979 A | | 11/1992 | Watkins et al. | 428/113 |
| 5,198,293 A | | 3/1993 | Metrick | 428/290 |
| 5,203,186 A | | 4/1993 | Zafiroglu | 66/192 |
| 5,227,228 A | | 7/1993 | Newell | 428/102 |
| 5,280,664 A | | 1/1994 | Lin | 15/247 |
| 5,334,446 A | | 8/1994 | Quantrille et al. | 442/35 |
| 5,342,436 A | * | 8/1994 | Thrasher | 106/10 |
| 5,464,096 A | | 11/1995 | Hurwitz | 206/494 |
| 5,470,648 A | | 11/1995 | Pearlman et al. | 442/26 |
| 5,525,397 A | | 6/1996 | Shizuno et al. | 428/138 |
| 5,599,550 A | | 2/1997 | Kohlruss et al. | 424/404 |
| 5,618,610 A | | 4/1997 | Tomita et al. | 428/152 |
| 5,620,779 A | | 4/1997 | Levy et al. | 428/167 |
| 5,830,558 A | | 11/1998 | Barnholtz | 428/171 |
| 5,843,279 A | | 12/1998 | Phan et al. | 162/109 |
| 5,874,159 A | | 2/1999 | Cruise et al. | 428/198 |

FOREIGN PATENT DOCUMENTS

| | | | |
|---|---|---|---|
| CA | 2038754 | 11/1991 | D04H/3/03 |
| CA | 2156958 | 3/1996 | B32B/5/16 |
| EP | 0 084 963 A2 | 8/1983 | D04H/1/44 |
| EP | 0 452 727 A1 | 10/1991 | D04H/13/00 |
| EP | 696 432 | 2/1996 | A47L/13/16 |
| EP | 0 774 229 A2 | 5/1997 | A47L/13/16 |
| GB | 1 331 817 | 9/1973 | B32B/3/28 |
| JP | 3-48981 | 10/1988 | D04H/5/02 |
| JP | 05-025763 | 2/1993 | D04H/1/46 |
| JP | 05-056902 A | 3/1993 | A47L/13/16 |
| JP | 05-093350 | 4/1993 | D04H/1/54 |
| JP | 06-014859 A | 1/1994 | A47L/13/16 |
| JP | 6-017361 | 1/1994 | D04H/1/54 |
| JP | 23189 | 9/1996 | A47L/13/18 |
| JP | 08-243065 A | 9/1996 | A47L/13/16 |
| JP | 10-127547 A | 5/1998 | A47L/13/16 |
| WO | WO 93/15247 | 8/1993 | D04H/1/48 |
| WO | WO 98/23199 | 6/1998 | A47L/13/16 |

* cited by examiner

CLEANING SHEETS, IMPLEMENTS, AND ARTICLES USEFUL FOR REMOVING ALLERGENS FROM SURFACES AND METHODS OF PROMOTING THE SALE THEREOF

CROSS REFERENCE TO RELATED APPLICATION

This application is a continuation-in-part of U.S. application Ser. No. 09/082,349, filed May 20, 1998, now U.S. Pat. No. 6,645,604 which claims the benefit of U.S. Provisional Application No. 60/055,330, filed Aug. 12, 1997 and U.S. Provisional Application No. 60/047,619, filed May 23, 1997.

FIELD OF THE INVENTION

This invention relates to cleaning sheets, implements, and articles particularly suitable for removal and entrapment of allergens, dust, lint, hair, sand, food crumbs, grass and the like, and methods of promoting the sale thereof.

BACKGROUND OF THE INVENTION

The use of nonwoven sheets for dry dust-type cleaning are known in the art. Such sheets typically utilize a composite of fibers where the fibers are bonded via adhesive, entangling or other forces. See, for example, U.S. Pat. No. 3,629,047 and U.S. Pat. No. 5,144,729. To provide a durable wiping sheet, reinforcement means have been combined with the staple fibers in the form of a continuous filament or network structure. See, for example, U.S. Pat. Nos. 4,808,467, 3,494,821 and 4,144,370. Also, to provide a product capable of withstanding the rigors of the wiping process, prior nonwoven sheets have employed strongly bonded fibers via one or more of the forces mentioned above. While durable materials are obtained, such strong bonding may adversely impact the materials' ability to pick up and retain particulate dirt. In an effort to address this concern, U.S. Pat. No. 5,525,397 to Shizuno et al. describes a cleaning sheet comprising a polymeric network layer and at least one nonwoven layer, wherein the two layers are lightly hydroentangled so as to provide a sheet having a low entanglement coefficient. The resulting sheet is said to provide strength and durability, as well as improved dust collecting performance because the composite fibers are lightly hydroentangled. Sheets having a low entanglement coefficient (i.e., not more than 500 m) are said to offer better cleaning performance because a greater degree of fibers are available for contact with dirt.

While the sheets described in the '397 patent are alleged to address some of the problems with prior nonwoven cleaning sheets, those sheets appear to be generally of a uniform basis weight, at least on a macroscopic level; and are essentially of a uniform caliper, again on a macroscopic level. That is, ordinary and expected basis weight and caliper fluctuations and variations may occur on a random basis, as a result of fluid pressure differentials during hydroentanglement. However, the structure would not be deemed to comprise discrete regions that differ with regard to basis weight. For example, if on a microscopic level, the basis weight of an interstice between fibers were measured, an apparent basis weight of zero would result when, in fact, unless an aperture in the nonwoven structure was being measured, the basis weight of such region is greater than zero. Such fluctuations and variations are a normal and expected result of the hydroentangling process. The skilled artisan would interpret nonwovens having such variations, including those described in the '397 patent, as having essentially a uniform basis weight and caliper, in the macroscopic sense. The result of a sheet having a uniform basis weight is that the material is not particularly suitable for collecting and entrapping soil of a diverse size, shape, and the like. As a result, little is known about the ability of such sheets to remove allergens from surfaces.

As such, there is a continuing need to provide cleaning sheets, implements, and articles of manufacture that offer improved allergen removal. Accordingly, it is an object of this invention to overcome the problems of the prior art and particularly to provide a cleaning sheet, implement, and article of manufacture, that has the ability to remove allergens from surfaces and communicates this benefit to consumers.

There is also a need to provide methods of promoting the sale of such cleaning sheets, implements; and articles to make consumers aware of the allergen-removal benefits of these products such that consumers will be motivated to use them, leading to a more healthy environment for the consumer.

SUMMARY OF THE INVENTION

The present invention relates to cleaning sheets, implements, and articles of manufacture for removing allergens from surfaces. A preferred cleaning sheet has at least two regions, where the regions are distinguished by basis weight. In particular, a preferred cleaning sheet comprises one or more high basis weight regions having a basis weight of from about 30 to about 120 $g/m^2$ and one or more low basis weight regions, wherein the low basis weight region(s) have a basis weight that is not more than about 80% of the basis weight of the high basis weight region(s). In a more preferred aspect, the first region is of relatively high basis weight and comprises an essentially continuous network. The second region comprises a plurality of mutually discrete regions of relatively low basis weight and which are circumscribed by the high basis weight first region. In particular, a preferred cleaning sheet comprises a continuous region having a basis weight of from about 30 to about 120 $g/m^2$ and a plurality of discontinuous regions circumscribed by the high basis weight region, wherein the discontinuous regions are disposed in a nonrandom, repeating pattern and have a basis weight of not more than about 80% of the basis weight of the continuous region. Although cleaning sheets with multiple basis weight regions are preferred, cleaning sheets having relatively uniform basis weight are also suitable in the present invention.

In one embodiment, a preferred cleaning sheet will have, in addition to regions which differ with regard to basis weight, substantial macroscopic three-dimensionality. As used herein, the term "macroscopic three-dimensionality", when used to describe three-dimensional cleaning sheets, means the three-dimensional pattern is readily visible to the naked eye when the perpendicular distance between the viewer's eye and the plane of the sheet is about 12 inches. In other words, the three-dimensional structures of the present invention are cleaning sheets that are non-planar, in that one or both surfaces of the sheet exist in multiple planes, where the distance between those planes is observable to the naked eye when the structure is observed from about 12 inches. By way of contrast, the term "planar" refers to cleaning sheets having fine-scale surface aberrations on one or both sides, the surface aberrations not being readily visible to the naked eye when the perpendicular distance between the viewer's eye and the plane of the web is about 12 inches or greater. In other words, on a macroscale, the observer would not observe that one or both surfaces of the sheet exist in multiple planes so as to be three-dimensional. The macroscopically three-dimensional structures of the present invention optionally comprise a scrim material, which when heated and then cooled, contracts so as to provide a macroscopic three-dimensional structure. Other materials which provide contractile forces so as to provide three-dimensionality are discussed below. Macroscopic three-dimensionality is described herein in terms of "average height differential", which is defined herein as the average distance between adjacent peaks and valleys of a given surface of a sheet, as well as the "average peak-to-peak" distance, which is the average distance between adjacent peaks of a given surface. Macroscopic three-dimensionality is also described in terms of the "Surface Topography Index" of the outward surface(s) of the cleaning sheet; Surface Topography Index is the ratio obtained by dividing the Average Height Differential of a surface by the Average Peak to Peak Distance of that surface. In one embodiment, both of the sheet's outward surfaces will have the described Average Peak to Peak Distance and Surface Topography properties. Methods for measuring Average Peak to Peak Distance and Average Height Differential are described in detail in the Test Method section, below. Although cleaning sheets having macroscopic three-dimensionality are preferred, cleaning sheets that are relatively planar are also suitable in the present invention.

The cleaning sheets of the present invention and similar sheets, especially those that contain additives at low levels, as described herein, and especially those where the additive is substantially uniformly attached over at least one continuous area, can be used in improved processes for cleaning and to provide desirable benefits for the consumer and user of the sheets, some of those benefits being ones that are not intuitively obvious to a consumer, as detailed hereinafter. A preferred benefit is the ability of the present cleaning sheets, implements, and articles to remove allergens from surfaces, especially household surfaces. It is therefore desirable to package the sheets, either in roll form, with perforations for aiding in separating sheets, or with means for separating the sheets into useful lengths, and/or packaging them in packages that inform the consumer of the improved processes and/or the benefits that can be obtained, especially those benefits that are not intuitively obvious to the consumer, such as the ability to remove allergens from surfaces. The cleaning sheets with additives, including those with desirable low levels of such additives, preferably substantially uniformly attached, at least in one, or more areas, provide, in combination, special performance benefits, and such combinations can provide improved benefits, especially when the sheets have the preferred structures set forth herein.

The present invention further relates to methods of promoting cleaning sheets, implements, and/or articles of manufacture for removing allergens from surfaces. The methods encompass a variety of steps by which consumers are informed of the benefits of the sheets, implements, and articles, especially the ability to remove allergens, in order to motivate the consumer to use a product, which they otherwise might not use, to remove allergens from surfaces thereby resulting in a more healthy environment for the consumer.

DETAILED DESCRIPTION OF THE INVENTION

I. Definitions

Figure 1:
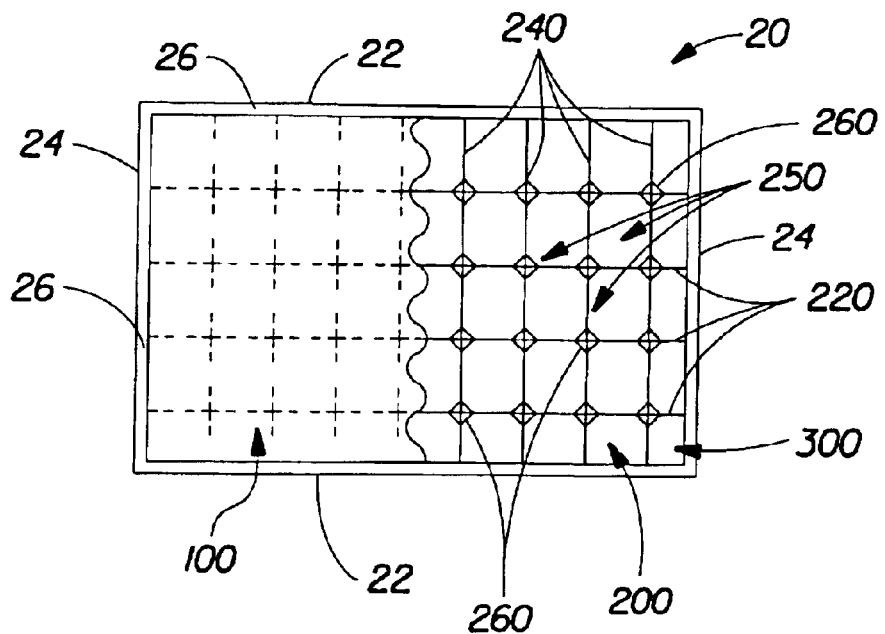
FIG. 1 is a plan view schematic illustration of a three layer embodiment of a cleaning sheet of the present invention, wherein the second layer comprises a scrim material having filaments which run parallel to the side and end edges of the sheet, wherein a portion of the first layer is shown cut away, and wherein surface features of the first layer are omitted for clarity.

As used herein, the term "comprising" means that the various components, ingredients, or steps, can be conjointly employed in practicing the present invention. Accordingly, the term "comprising" encompasses the more restrictive terms "consisting essentially of" and "consisting of".

As used herein, the term "hydroentanglement" means generally a process for making a material wherein a layer of loose fibrous material (e.g., polyester) is supported on an apertured patterning member and is subjected to water pressure differentials sufficiently great to cause the individual fibers to entangle mechanically to provide a fabric. The apertured patterning member may be formed, e.g., from a woven screen, a perforated metal plate, etc.

As used herein, the term "Z-dimension" refers to the dimension orthogonal to the length and width of the cleaning sheet of the present invention, or a component thereof The Z-dimension usually corresponds to the thickness of the sheet.

As used herein, the term "X-Y dimension" refers to the plane orthogonal to the thickness of the cleaning sheet, or a component thereof. The X and Y dimensions usually correspond to the length and width, respectively, of the sheet or a sheet component.

As used herein, the term "layer" refers to a member or component of a cleaning sheet whose primary dimension is X-Y, i.e., along its length and width. It should be understood that the term layer is not necessarily limited to single layers or sheets of material. Thus the layer can comprise laminates or combinations of several sheets or webs of the requisite type of materials. Accordingly, the term "layer" includes the terms "layers" and "layered."

For purposes of the present invention, an "upper" layer of a cleaning sheet is a layer that is relatively further away from the surface that is to be cleaned (i.e., in the implement context, relatively closer to the implement handle during use). The term "lower" layer conversely means a layer of a cleaning sheet that is relatively closer to the surface that is to be cleaned (i.e., in the implement context, relatively further away from the implement handle during use).

As used herein, the term "allergen" refers to "the ability of certain materials to induce specific manifestations of hypersensitivity in man . . . and the associated special antibodies in the serum of such patients are known as reagins." K. Landsteiner, THE SPECIFICITY OF SEROLOGICAL REACTIONS 9 (Dover Publications, NY, rev. ed. 1962), which is hereby incorporated by reference. A reagin is defined as an antibody found in the blood of individuals having a genetic predisposition to allergies. Allergy is the study and treatment of human hypersensitivity reactions producing a pathogenic response to nonself molecules termed allergens. Hypersensitivity (allergic) responses are a type of immune response. Antigens that induce hypersensitivity responses are known as allergens. All allergens are antigens but not all antigens are allergens. The definition of an antigen: "An antigen may be defined as a substance that can induce an immune response. Such a response may consist of antibody production or of stimulation of immunologically active T cells. The antigen can react with those antibodies or with receptors on those T cells that it stimulates." A. Nisonoff, INTRODUCTION TO MOLECULAR IMMUNOLOGY 1–2 (Sinauer Assocites, Sunderland, Mass.), which is hereby incorporated by reference.

Dust mites, house dust, animal dander, animal hair, and the like, represent a mix of substances that contain allergens. Not all substances found in dust mite, house dust, animal dander, animal hair, etc. are capable of inducing an immune response, much less an allergic response. Some of these substances are antigens. They will induce a specific immune response. Some of these antigens are also allergens—they will induce a hypersensitivity response in susceptible individuals. Common allergens present indoors include, but are not limited to, *Dermarophagoides pteronyssinus* and *Dermatophagoides farinae* (both from dust mites), *Felis domesticus* (from cats), *Canis familiaris* (from dogs), *Blatella germanica* (from German cockroach), *Penicillium*, *Aspergillus* and *Cladosporium* (from fungi), as well as allergens from outdoors that enter the indoor environment, eg., pollen allergens.

As used herein, the term "allergy-related product" refers to products that are marketed to help relieve and/or prevent allergy-related symptoms or control allergens, as well as the source of allergens, such as dust mites. Allergy-related products include, but are not limited to: non-prescription drugs; prescription drugs, especially including, but not limited to, antihistamines, antiinflammatory drugs, glucocorticosteroids, beta-adrenergics and leukotriene modifiers or antagonists; products that control and/or kill the sources of allergens, such as dust mites, including, but not limited to, carpet powders, household sprays, pillowcases, and mattress covers; air filters; HEPA filters; vacuums, especially those with HEPA filters; air purification devices; air pollution monitors; books (especially those relating to the treatment of allergy-related symptoms); face masks for filtering air; water filters (especially those for use in showers and/or bathtubs); household cleaning products, including, but not limited to, hard surface cleaning detergents (especially for floors and countertops), dusting sprays (especially for dusting and/or polishing furniture and household surfaces), and laundry detergents and/or additives capable of controlling and/or killing allergens and the sources thereof; personal cleansing products for either humans and/or animals including, but not limited to, bar soaps, liquid soaps, shampoos, and skin lotions; and the like. As defined herein, the term "allergy-related product" further includes the present cleaning sheets, implements, and articles of manufacture.

As used herein, the term "traditional cleaning device" refers to prior products used by consumers for many years to mop and/or dust household surfaces (especially floors). Traditional cleaning devices include, but are not limited to, brooms with nylon bristles, brooms with foam broom heads, brooms with rubber bristles, dust mops with looped cotton strings, dust mops with chamois-type head covers, and the like. Traditional cleaning devices do not include the present cleaning sheets or the present cleaning implements comprising a handle to which the present cleaning sheets are removably attached.

As used herein, the term "promotional material" refers to a variety of marketing materials, preferably printed materials, which convey to consumers the ability of the present cleaning sheets, implements, and/or articles of manufacture to remove allergens from surfaces. Preferably, the promotional material further comprises information regarding the health benefits of reducing the amount of allergens on surfaces and airborne particulates in the environment. Promotional materials include, but are not limited to: brochures (especially for medical care professionals and the patients thereof); print advertisements in newspapers, magazines, journals, and the like; packages containing the present cleaning sheets and implements; leaflets; radio and/or television advertisements; discount coupons (especially those redeemable upon purchase of the present cleaning sheets, implements, and/or articles); direct mail advertisements; electronic mail advertisements; fact sheets; magnets; pencils; pens; buttons; notepads; prescription pads; and the like.

As used herein, the term "pharmacy department" refers to an area of a retail store that is primarily dedicated to the display and/or sale of pharmaceutical products both prescription and non-prescription. A variety of health care products are typically displayed and/or sold in a pharmacy department of a retail store. A pharmacy department can include a pharmacy from which prescriptions for prescription drugs are filled and dispensed to patients. A pharmacy department does not encompass a household cleaners department which typically has an aisle(s) for displaying and/or selling household cleaning products such as hard surface cleaners, mops, brooms, air fresheners, and the like.

As used herein, the term "medical care professional" refers to a variety of health care providers including, but not limited to, physicians, osteopaths, homeopaths, chiropractors, nurses, nurse practitioners, medical office managers, pharmacists, pharmacy technicians, and the like. The medical care professional preferably specializes in the treatment of allergies.

All percentages, ratios and proportions used herein are by weight unless otherwise specified.

II. Cleaning Sheets Useful for Removing Allerpens from Surfaces

The present invention relates to a cleaning sheet useful for removing allergens, dust, lint, hair, grass, sand, food crumbs and other matter of various size, shape, consistency, etc., from a variety of surfaces. Preferably, the cleaning sheets will demonstrate improved cleaning performance in consumer panel testing.

As a result of the ability of the cleaning sheets to reduce, or eliminate, by various means, including contacting and holding, allergens, dust, lint and other airborne matter from surfaces, as well as from the air, the sheets will provide greater reduction in the levels of such materials on surfaces and in the atmosphere, relative to other products and practices for similar cleaning purposes. This ability is especially apparent in sheets containing additives as described herein. Even the sheets of U.S. Pat. No. 5,525,397, which is hereby incorporated by reference, can provide this benefit, albeit to a lesser extent than the preferred structures herein, and therefore it is important to provide this information on the package, or in association with the package, so as to encourage the use of the sheets, including those of the '397 patent, especially for removing allergens on traditional household surfaces such as vinyl flooring, hardwood flooring, countertops, furniture, electronic equipment, and the like, as well as on non-traditional surfaces like upholstery, drapes, rugs, clothing, and the like where dusting sheets have not normally been used. The use of a low level of additive, uniformly attached on at least one continuous area of the sheet in an effective amount to improve the adherence of soil, especially particulates, and especially those particulates that provoke an allergic reaction, provides a surprising level of control over soil adherence. At least in those areas where the additive is present on the sheet, the low level is important for such use, since, unlike traditional dusting operations where oils are applied as liquids, or as sprays, there is much less danger of creating a visible stain, especially on such non-traditional surfaces, when the sheet is used. The preferred structures also provide benefits by trapping larger particles rather than abrading them to smaller sizes.

Consumers with allergies especially benefit from the use of the sheets herein, including cleaning sheets such as those described in the '397 patent and also the preferred structures herein, since allergens are typically in dust form and it is especially desirable to reduce the level of small particles that are respirable. For this benefit, it is important to use the sheets on a regular basis, and not just when the soil becomes visually apparent, as in prior art procedures. It is important to inform consumers that the present cleaning sheets, implements, and articles remove a large percentage of allergens from a surface to encourage consumers that might not otherwise use the cleaning sheets to use them.

Other types of cleaning sheets useful in the present invention for removing allergens from surfaces include spunbonded cleaning sheets, heat-bonded cleaning sheets, meltblown cleaning sheets, resin bonded cleaning sheets, air-through bonded cleaning sheets, and the like. Preferred cleaning sheets for removing allergens from surfaces are hydroentangled, nonwoven cleaning sheets. The cleaning sheets preferably comprise an additive as described herein to improve the ability of the cleaning sheet to remove allergens from surfaces. Suitable cleaning sheets are also described in co-pending U.S. Provisional Application Serial No. 60/148, 261 filed Aug. 11, 1999 by Kacher et al a. Optional Multiple Basis Weights In a preferred embodiment, the present invention relates to a cleaning sheet having at least two regions, where the regions are distinguished by basis weight. In particular, the cleaning sheet comprises one or more high basis weight regions having a basis weight of from about 30 to about 120 g/m$^2$ (preferably from about 40 to about 100 g/m$^2$, more preferably from about 50 to about 90 g/m$^2$, still more preferably from about 60 to about 80 g/m$^2$) and one or more low basis weight regions, wherein the low basis weight region(s) have a basis weight that is not more than about 80% of the basis weight of the high basis weight region(s). Preferred cleaning sheets in this regard comprise a continuous high basis weight region and a plurality of discontinuous regions circumscribed by the continuous high basis weight region, wherein the discontinuous regions are disposed in a nonrandom, repeating pattern and have a basis weight of not more than about 80% of the basis weight of the continuous region.

Preferably, the low basis weight region(s) of the cleaning sheet will have a basis weight of not more than about 60%, more preferably not more than about 40%, and still more preferably not more than about 20%, of the basis weight of the high basis weight region(s). The cleaning sheets will preferably have an aggregate basis weight of from about 20 to about 110 g/m$^2$, more preferably from about 40 to about 100 g/m2, still more preferably from about 60 to about 90 g/m$^2$. With respect to the low basis weight region(s), it is preferred that the basis weight not be zero in such regions such that macroscopic apertures are present. This is because soil will be allowed to penetrate completely through the cleaning sheet, and will not be retained therein. In other words, the entrapment level of the sheet will not be optimized in such situations.

In those embodiments where a continuous high basis weight region surrounds discrete low basis weight regions, it is preferred that at least about 5% of the cleaning sheet's total surface area be the low basis weight regions. More preferably, at least about still more preferably at least about 15%, still more preferably at least about 20%, still more preferably at least about 30%, of the cleaning sheet's total surface area will be the low basis weight regions. In those embodiments where discrete high basis weight regions are surrounded by a continuous low basis weight region, it is preferred that at least about 5% of the cleaning sheet's total surface area be the discrete high basis weight regions. More preferably, at least about 10%, still more preferably at least about 15%, still more preferably at least about 20%, still more preferably at least about 30%, of the cleaning sheet's total surface area will be the high basis weight regions.

In those preferred embodiments having a continuous high basis weight region surrounding discrete, low basis weight regions, the discrete low basis weight regions may be staggered in, or may be aligned in, either or both of the X and Y directions. Preferably, the high basis weight essentially continuous network forms a patterned network circumjacent the discrete low basis weight regions, although, as noted, small transition regions may be accommodated.

It will be apparent to one skilled in the art that there may be small transition regions having a basis weight intermediate the basis weights of the high basis weight region(s) and the low basis weight region(s), which transition regions by themselves may not be significant enough in area to be considered as comprising a basis weight distinct from the basis weights of either adjacent region. Such transition regions are within the normal manufacturing variations known and inherent in producing a structure according to the present invention. It will also be recognized that within a given region (whether high or low basis weight), ordinary and expected basis weight fluctuations and variations may occur, when such given region is considered to have one basis weight. For example, if on a microscopic level, the basis weight of an interstice between fibers is measured, an apparent basis weight of zero will result when, in fact, the basis weight of such region is greater than zero. Again, such fluctuations and variations are a normal and expected result of the manufacturing process.

Figure 10:
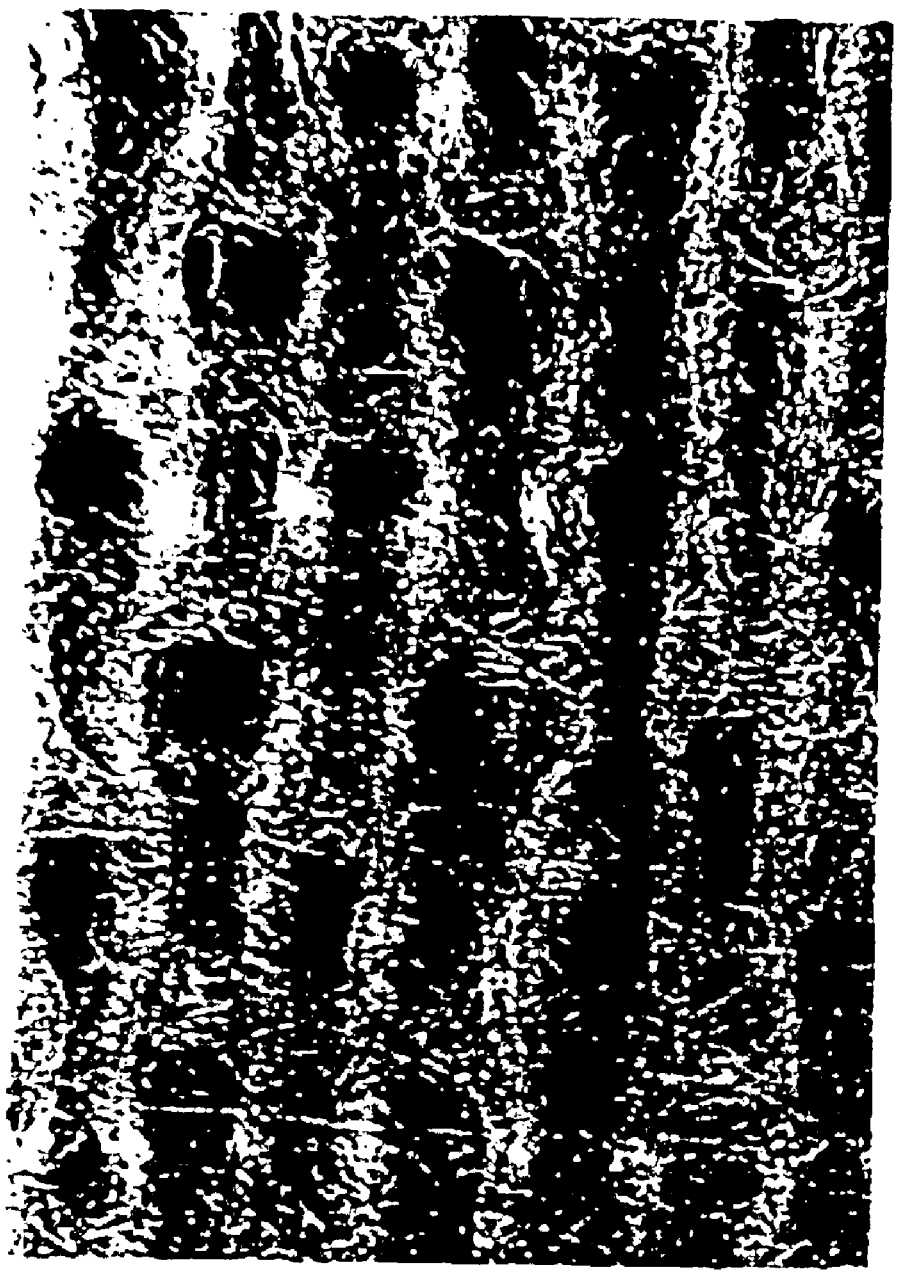
FIG. 10 is a photograph (12×magnification) of a cleaning sheet of the present invention, which depicts the high basis weight continuous region and a plurality of low basis weight discrete regions.
Figure 11:
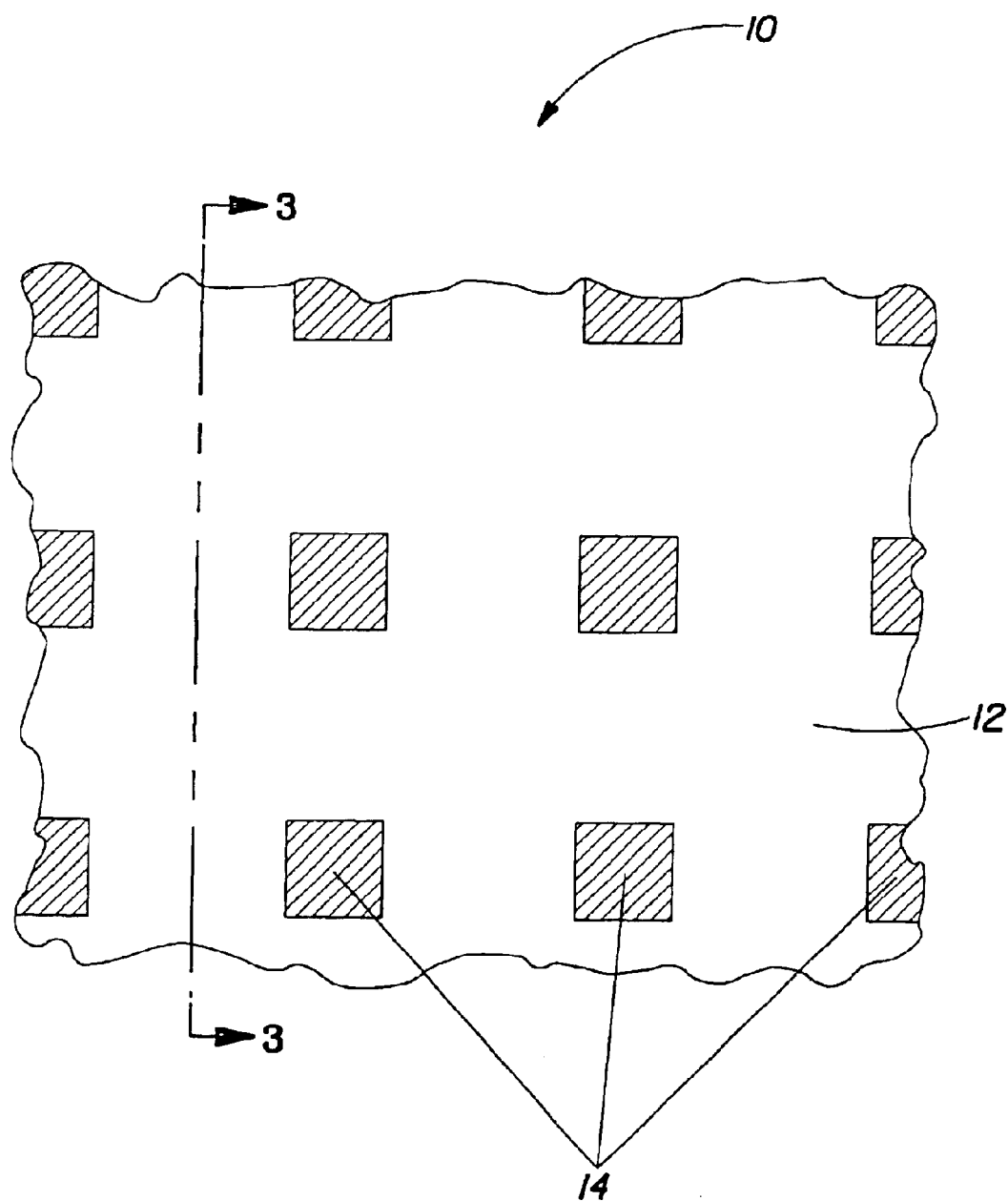
FIG. 11 is a plan view of the sheet depicted in FIG. 10, to facilitate discussion of the basis weight differences of the sheet.

FIG. 10 is a photograph of a portion of a preferred nonwoven sheet of the present invention having a continuous high basis weight region surrounding discrete low basis weight regions. While no call-out numbers are shown, it is seen that the high basis weight continuous region appears as the light network and the low basis weight regions are the darker discrete regions. FIG. 11 is plan view of a portion of a nonwoven sheet to further depict this aspect of the sheet shown in FIG. 10. In particular, in FIG. 11, nonwoven sheet 10 has a continuous high basis weight region 12 and discrete low basis weight regions 14. In this representative illustration, an optional scrim material is not shown. While the low basis weight regions 14 are depicted as being of essentially the same size and of a single well defined shape, these regions may be of differing sizes to facilitate entrapment of particles of varying size and shape. Also, it will be recognized that the shape of the low basis weight regions 14, and accordingly the continuous high basis weight region 12, may vary throughout the structure.

Differences in basis weights (within the same structure 10) between the high and low basis weight regions 12 and 14 of at least 20% are considered to be significant, and define distinct regions for purposes of the present disclosure. For a quantitative determination of basis weight in each of the regions 12 and 14, and hence a quantitative determination of the differences in basis weight between such regions 12 and 14, a quantitative method, such as image analysis of soft X-rays as disclosed in U.S. Pat. No. 5,277,761, issued to Phan et al. on Jan. 11, 1994, may be utilized, which patent is incorporated herein by reference. This method is also applicable where the regions of high and low basis weight are not arranged in a continuous/discrete pattern such as that shown in FIG. 2.

The relative area of the low basis weight regions and high basis region may be measured quantitatively using image analysis techniques. A software platform for making such measurements is the following:

IA Software is developed using macro language of Optimas 6.11, a commercial image analysis software package available from Optimas Corp. (Bothell, Wash.).

Input Images:

The input to the program are the images of the sheets acquired by light microscope. These images are digitized to 8-bit monochrome gray. The size of the images are 512 pixels by 486 pixels. In physical measurements, the image is approximately an area of 14.5 mm by 11.0 mm.

Image Analysis:

Every digital image is analyzed using the same identical procedure outlined below:

Step 1: Select a region of interest (ROI) in the image.
(This is done because the lighting is not uniform across the whole image. Therefore, a border around the edges are omitted from analysis. For all images the same region of interest is chosen.)

Step 2: Run a 3×3 Averaging filter inside the ROI.
(Averaging filter reduces noise in the digital images.)

Step 3: Auto calculate the gray level threshold (T) to segment pore areas.
(The pores appear dark in the images. Utilize GetAuto Threshold function provided by Optimas macro language to isolate the dark areas within the ROT. Of the many options provided by GetAutoThreshold for selecting a threshold, the method of "Search for minimum in region about the mean", is believed to offer the best results. Refer to Optimas 6.11 On-line Help on GetAutoThreshold.)

Step 4: Select the threshold to be from zero (0) to 10.0 and identify all pixels having gray values within this limit to be pores.
(The threshold chosen automatically by GetAutoThreshold may be further decremented by 10 gray levels.)

Step 5: Create objects of pore areas.

Step 6: For each pore area extract its size in square millimeters and diameter of the circle with an equivalent square millimeter area.

Output Results:

The output of image analysis is written to an Excel spread sheet. The output per each image contains the threshold, the number of pore areas found, the percentage of total pore area to total area of ROI, and a list of individual pore sizes and equivalent diameters.

Applicants have found that by introducing in the cleaning sheet macroscopic areas of relatively low basis weight discrete regions, selected and optimized as to physical dimensions, such as size and height, and/or basis weight, it is possible to create sheets that provide enhanced removal and entrapment of large-sized materials, such as sand, grass, food crumbs and other soils of a relatively large size and varying shapes and consistency. At the same time, the relatively high basis weight region provides for removal and entrapment of smaller size materials, such as fine dust, lint, powder and the like. With regard to the preferred sheets having a continuous high basis weight region surrounding a plurality of low basis weight regions, while basis weight differences are an important aspect, also important is the relative size of the discontinuous, low basis weight regions. Applicants have found that with regard to collecting and entrapping large particle dirt such as sand and smaller food crumbs, it is preferred that the area of a substantial number of the individual low basis weight regions be from about 0.02 to about 0.5 mm$^2$, more preferably from about 0.08 to about 0.4 mm$^2$, still more preferably from about 0.1 to about 0.3 mm$^2$. It is also preferred that longest dimension of a substantial number of the individual discrete low basis weight be in the range of from about 100 to about 1200 $\mu$m, more preferably from about 250 to about 1000 $\mu$m. While the skilled artisan will recognize that the size of the individual low basis weight regions may be larger or smaller, depending on the desired end-use of the product, these ranges are preferred for typical household cleaning. It may also be desirable to include in an individual cleaning sheet discontinuous regions of varying sizes. When using a nonwoven material in making the cleaning sheet, this can be accomplished by using a patterning belt having varying aperture sizes. In addition to having relatively low basis weights, it is preferred that discontinuous regions of the cleaning sheet have a relatively smaller caliper (i.e., thickness in the Z direction) than the continuous high basis weight region. This further enhances the ability of the sheet to entrap large particles that are engaged by the structure. Without wishing to be bound by theory, Applicants believe that the low basis weight regions provide sufficient space between fibers for the larger particles to be contained. Also, the lower caliper in these regions keeps the larger particles more remote from the structure's surface, thereby reducing the level of contact the entrapped particles have during further wiping of the surface being cleaned.

With regard to caliper differences, it is preferred that the caliper difference between the discontinuous regions and the continuous region is at least about 25%. More preferably, the caliper difference will be at least about 40%, still more preferably at least about 55%. A means for measuring caliper of the respective regions is described in the Test Methods section.

The cleaning sheets of the present invention will preferably exhibit elongation, particularly in the CD direction, that will improve their conformability, whether used as a stand alone product or when used in combination with a cleaning implement. In this regard, these structures will preferably have a CD elongation value at 500 g of at least about 10%, more preferably at least about 20%, more preferably at least about 35%, still more preferably at least about 45%, and still more preferably 60%.

As noted above, the hydroentangling process is not new. However, the preferred cleaning sheets of the present invention comprise a hydroentangled composite of fibers, wherein the patterning member (also referred to herein as the forming belt) used in the hydroentangling process has a structure that provides the desired basis weight differential between continuous and discontinuous regions, as well as desired caliper differential between these regions, in the structure formed thereon. While the selection of the specific patterning member is not critical, it is important that the member have sufficient openness (i.e., aperture size) to provide the macroscopic differences in basis weight between the continuous and discontinuous regions of the cleaning sheet. In this regard, the patterning member will preferably have from about 15 to about 60 openings per inch to provide a total of from about 20 to about 45 percent open area. In a particularly preferred embodiment, the forming belt will be formed from polyester fibers (filaments) arranged in the MD and CD direction. A preferred belt has the following characteristics:

| Mesh: | |
| --- | --- |
| MD | 23 filaments/in. |
| CD | 17 filaments/in. |
| Filaments diameter (in.) - CD and MD | 0.24 polyester |
| Air permeability (ft$^3$/min) | 685 | where MD refers to the machine direction of the entanglement process, and CD refers to the cross direction of the entanglement process. A belt having these characteristics is available from Albany International, Engineered Fabrics Division, Appleton, Wis., as belt 23C.

The cleaning sheets of the present invention can be made using either a woven or nonwoven process, or by forming operations using melted materials laid down on forms, especially in belts, and/or by forming operations involving mechanical actions/modifications carried out on films. The structures are made by any number of methods (e.g., spunbonded, meltblown, resin bonded, air-through bonded, etc.), once the essential three dimensional and basis weight requirements are known. However, the preferred structures are nonwoven, and especially those formed by hydroentanglement as is well known in the art, since they provide highly desirable open structures. Therefore, preferred cleaning sheets are nonwoven structures having the characteristics described herein. Materials particularly suitable for forming the preferred nonwoven cleaning sheet of the present invention include, for example, natural cellulosics as well as synthetics such as polyolefins (e.g., polyethylene and polypropylene), polyesters, polyamides, synthetic cellulosics (e.g., RAYON®), and blends thereof. Also usefull are natural fibers, such as cotton or blends thereof and those derived from various cellulosic sources. Preferred starting materials for making the hydroentangled fibrous sheets of the present invention are synthetic materials, which may be in the form of carded, spunbonded, meltblown, airlaid, or other structures. Particularly preferred are polyesters, especially carded polyester fibers. The degree of hydrophobicity or hydrophilicity of the fibers is optimized depending upon the desired goal of the sheet, either in terms of type of soil to be removed, the type of additive that is provided, when an additive is present, biodegradability, availability, and combinations of such considerations. In general, the more biodegradable materials are hydrophilic, but the more effective materials tend to be hydrophobic.

The cleaning sheets may be formed from a single fibrous layer, but preferably are a composite of at least two separate layers. Preferably, the sheets are nonwovens made via a hydroentangling process. In this regard, prior to hydroentangling discrete layers of fibers, it may be desired to slightly entangle each of the layers prior to joining the layers by entanglement and before joining. Hydroentangled nonwoven cleaning sheets tend to exhibit a superior ability remove allergens from surfaces, due to the allergen material becoming easily trapped within the entangled fibers of the cleaning sheets.

In a particularly preferred embodiment of the present invention, to enhance the integrity of the final sheet, it is preferred to include a polymeric net (referred to herein as a "scrim" material) that is arranged with the fibrous material, e.g., though lamination via heat or chemical means such as adhesives, via hydrogentanglement. Scrim materials useful herein are described in detail in U.S. Pat. No. 4,636,419, which is incorporated by reference herein. The scrims may be formed directly at the extrusion die or can be derived from extruded films by fibrillation or by embossment, followed by stretching and splitting. The scrim may be derived from a polyolefin such as polyethylene or polypropylene, copolymers thereof, poly(butylene terephthalate), polyethylene terephthalate, Nylon 6, Nylon 66, and the like. Scrim materials are available from various commercial sources. A preferred scrim material useful in the present invention is a polypropylene scrim, available from Conwed Plastics (Minneapolis, Minn.).

b. Optional Macroscovic Three-dimensionality

As indicated above, in another embodiment the present cleaning sheets can also be macroscopically three-dimensional. These sheets are preferably relatively open structures compared to, e.g., paper towels. In one such preferred embodiment, the macroscopically three-dimensional cleaning sheets have a first surface and a second surface and comprise a scrim or other contractible material. In one such preferred embodiment, the cleaning sheet has a first outward surface and a second outward surface and comprises a contractible (preferably a scrim) material, wherein the Average Peak to Peak Distance of at least one outward surface is preferably at least about 1 mm and the Surface Topography Index of that surface(s) is preferably from about 0.01 to about 5. Methods for measuring Average Peak to Peak Distance and Average Height Differential are described in detail in the Test Method section, below.

Regardless of the configuration of the cleaning sheets, the Average Peak to Peak Distance of at least one outward surface will preferably be at least about 1 mm, more preferably at least about 2 mm, and still more preferably at least about 3 mm. In one embodiment, the Average Peak to Peak distance is from about 1 to about 20 mm, particularly from about 3 to about 16 mm, more particularly from about 4 to about 12 mm. The Surface Topography Index of at least one outward surface will preferably be from about 0.01 to about 10, preferably from about 0.1 to about 5, more preferably from about 0.2 to about 3, still more preferably from about 0.3 to about 2. At least one outward surface will preferably have an Average Height Differential of at least about 0.5 mm, more preferably at least about 1 mm, and still more preferably at least about 1.5 mm. The Average Height Differential of at least one outward surface will typically be from about 0.5 to about 6 mm, more typically from about 1 to about 3 mm.

FIGS. 1–9 all depict aspects of cleaning sheets having macroscopic three-dimensionality. While it is understood that these sheets can also have regions of differing basis weight, as discussed above and shown in FIGS. 10 and 11, this aspect of the sheets is not shown or discussed with reference to FIGS. 1–9.

FIG. 1 illustrates a macroscopically three-dimensional, multiple layer cleaning sheet 20 according to a preferred embodiment of the present invention. The cleaning sheet 20 includes side edges 22 and end edges 24. The side edges 22 extend generally parallel to the length of the sheet 20, and the end edges 24 extend generally parallel to the width of the sheet. Optionally, the sheet 20 can include an edge seal 26 extending around the perimeter of the sheet. Such an edge seal 26 can be formed by heating, by use of adhesives, or by a combination of heating and adhesives.

The cleaning sheet 20 includes a first layer 100 and a second layer 200. Preferably, the cleaning sheet also includes a third layer 300. The second layer 200 can be disposed between the first layer 100 and the third layer 300. In FIG. 1, a portion of the first layer 100 is shown cut away to reveal underlying portions of the second layer 200 and the third layer 300.

The first layer 100 can be formed from woven materials, nonwoven materials, paper webs, foams, battings, and the like such as are known in the art. Particularly preferred materials are nonwoven webs having fibers or filaments distributed randomly as in "air-laying" or certain "wet-laying" processes, or with a degree of orientation, as in certain "wet-laying" and "carding" processes. The fibers or filaments of the first layer 100 can be natural, or of natural origin (e.g. cellulosic fibers such as wood pulp fibers, cotton linters, rayon, and bagasse fibers) or synthetic (e.g. polyolefins, polyamides or polyesters). The third layer 300 can be substantially the same as the first layer 100, or alternatively, can be of a different material and/or construction.

In one embodiment, the first layer 100 and the third layer 300 can each comprise a hydroentangled web of synthetic nonwoven fibers having a denier of less than about 4.0, preferably less than about 3.0, more preferably less than about 2.0 grams, per 9000 meter of fiber length. A suitable first layer 100 (as well as a suitable third layer 300) is a hydroentangled web of polyester fibers having a denier of about 1.5 grams or less per 9000 meters of fiber length, and the web having a basis weight of about 30 grams per square meter. A suitable web is available from PGI Nonwovens of Benson, N.C. under the designation PGI 9936.

The second layer 200 is joined in a discontinuous manner to the first layer 100 (and to third layer 300 when present), and provides gathering of the first layer by contraction of the second layer. Contraction mechanisms include, but are not limited to, heat contraction and elastic properties of the second layer. As discussed above, in one such embodiment, the second layer 200 comprises a net-like arrangement of filaments having openings defined by adjacent filaments. Alternatively, the second layer could be in the form of a polymeric film, which can optionally have openings therethrough; to provide the requisite contraction mechanism, such films must have sufficient elasticity to provide the gathering function that results in surface three. dimensionality. The film can be embossed so as to provide surface depressions instead of or in addition to openings. In another alternative, the contractile effects can be generated by inclusion of fibers that contract upon heating and recooling. In this approach, certain of the fibers will not shrink, but because they are mechanically associated to the shrinkable fibers, the entire sheet will "pucker" on contraction of the shrinkable fibers, so long as such fibers are included at a sufficient level.

In the embodiments illustrated, the second layer comprises a net like arrangement of filaments including a first plurality of filaments 220 and a second plurality of filaments 240. The filaments 220 extend generally parallel to one another, and the filaments 240 extend generally parallel to one another and generally perpendicular to the filaments 220. The filaments extend between filament intersections 260. The intersecting, adjacent filaments 220 and 240 define openings 250 in the second layer 200. The filament intersections and openings 250 are arranged in a generally nonrandom, repeating grid-like pattern.

The second layer 200 can comprise a polymeric net (referred to herein as a "scrim material"). Suitable scrim materials are described in U.S. Pat. No. 4,636,419 incorporated herein by reference. The scrim can be derived from a polyolefin such as polyethylene or polypropylene, or copolymers thereof, poly(butylene terephthalate), polyethylene terephthalate, Nylon 6, Nylon 66, and the like, and mixtures thereof.

The scrim material is preferably joined to the layers 100 and 300 through lamination via heat or chemical means such as adhesives. Preferably, the filaments of the scrim material contract relative to the layers 100 and 300 upon heating, such that contraction of the second layer 200 gathers the layers 100 and 300, and imparts a macroscopic three dimensional texture to the outer surfaces of the layers 100 and 300, as is described in more detail below.

A particularly suitable scrim material useful as the second layer 200 is a heat activated reinforcing netting available from Conwed Plastics of Minneapolis, Min. as THERMA-NET® brand reinforcing netting, having a polypropylene/EVA resin, 2 sided adhesive, and a filament count of 3 filaments per inch by 2 filaments per inch prior to contraction such as by heating. After heating, the second layer 200 can have between about 3.5 to 4.5 filaments per inch by between about 2.5 to 3.5 filaments per inch.

By "2 sided adhesive" it is meant that the EVA adhesive (Ethyl-Vinyl Acetate adhesive) is present on both sides of the filaments. The activation temperature of the EVA is generally about 85° C. (about 185° F.). During lamination of the layer 200 to the polyester fibers of the layers 100 and 300, the EVA adhesive is activated to provide bonding between the filaments of the layer 200 and the fibers of the layers 100 and 300. Without being limited by theory, it is believed that pressing at a relatively low pressure (e.g. less than 50 psi and more preferably less than 25 psi) for a relatively short time (e.g. less than about 30 seconds), the filaments of the layer 200 are not continuously bonded to the nonwovens of layers 100 and 300. This discontinuous bonding, along with the shrinkage of the polypropylene filaments upon heating, provides enhanced texture of the outward surfaces of layers 100 and 300.

In FIG. 1, the filaments 220 extend generally parallel to the side edges 22 and to the length of the sheet 20. Likewise, the filaments 240 extend generally parallel to the end edges 24 and to the width of the sheet 20.

Alternatively, the filaments 220 can be inclined at an angle of between about 20 and about 70 degrees with respect to the length of the sheet 20 and the side edges 22, and more preferably between about 30 degrees and about 60 degrees. The filaments 240 can be inclined at an angle of between about 20 and about 70 degrees with respect to the width of the sheet 20 and the end edges 24, and more preferably between about 30 degrees and about 60 degrees.

Figure 2:
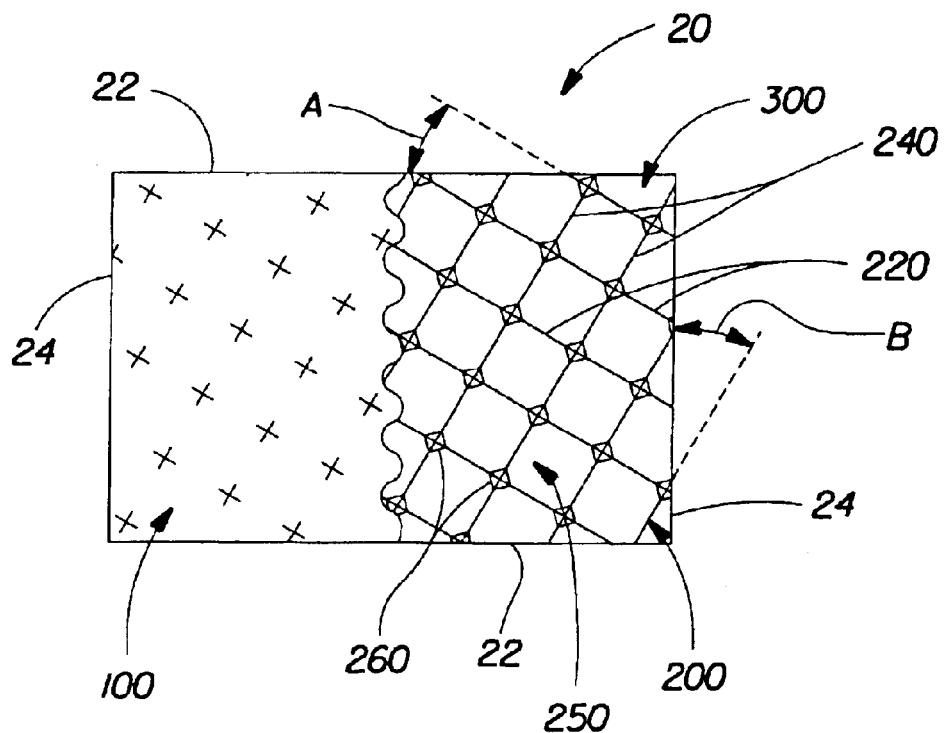
FIG. 2 is an illustration of the type shown in FIG. 1 depicting an alternative embodiment of the present invention wherein the filaments of the second layer are inclined at an angle of about 45 degrees relative to the side and end edges of the cleaning sheet.

FIG. 2 shows an embodiment of the present invention wherein the filaments 220 are inclined at an angle of about 45 degrees with respect to the side edges 22 (Angle A in FIG. 2), and wherein the filaments 240 are inclined at an angle of about 45 degrees with respect to the end edges 24 (Angle B in FIG. 2). Such an arrangement provides the advantage that the angled orientation of the filaments 220 and 240 with respect to the length and width of the sheet 20 permits deformation of the net structure of layer 200 parallel to the edges 22 and 24. Such deformation provides the sheet with elastic like behavior parallel to the length and width of the sheet.

By "elastic like behavior" it is meant that the element in question can be elongated under tension in a direction to have an elongated dimension measured in that direction which is at least 120 percent of the element's original, relaxed dimension in that direction, and that upon release of the elongating tension the element recovers to within percent of its relaxed dimension.

An important aspect of one embodiment of the present invention is that the first layer 100 is intermittently bonded to the second layer 200. In particular, the first layer 100 can be intermittently bonded to the second layer 200 at the filament intersections 260, while portions of the filaments 220, portions of the filaments 240, or portions of both the filaments 220 and 240 intermediate the filament intersections 260 remain unbonded to the first layer 100.

As a result, the surface texture of the outer surface of the first layer 100 is not limited by the geometry of the openings in the net-like arrangement of filaments, but rather, is decoupled from the repeating, nonrandom geometry of the openings 250. Similarly, the third layer 300 can be intermittently bonded to the second layer 200 to provide similar surface texture to the outer surface of the third layer 300.

The surface texture of the first layer 100 is omitted in FIGS. 1 and 2 for clarity. The surface texture is shown in FIGS. 3–8.

Figure 3:
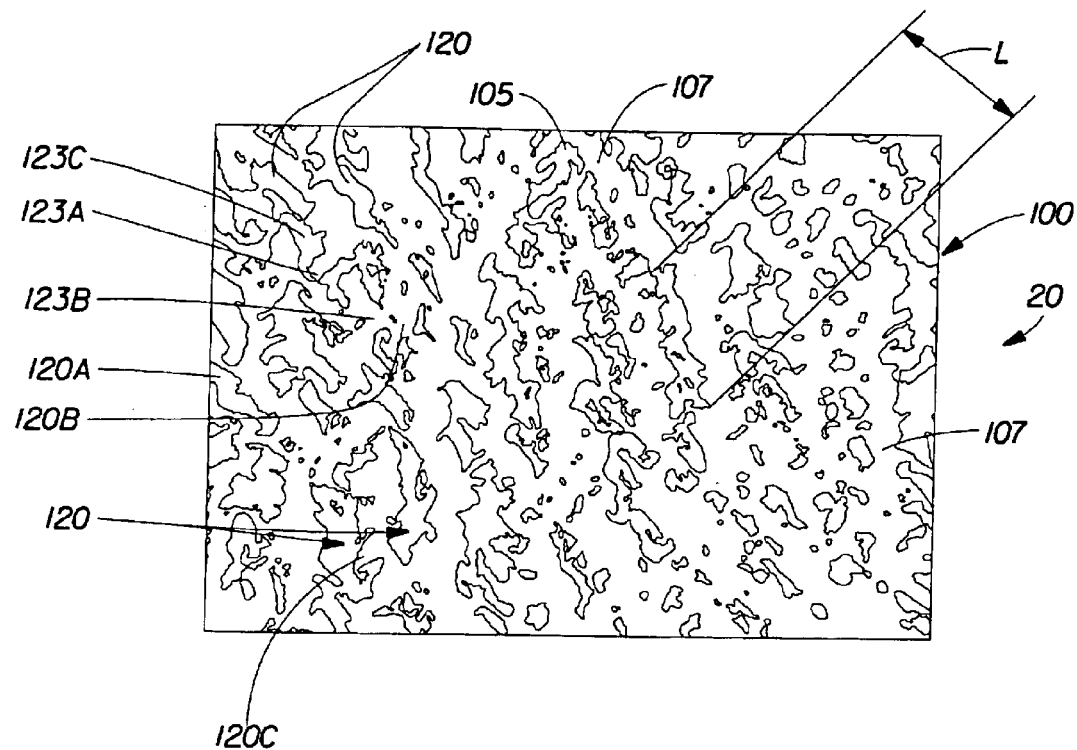
FIG. 3 is a plan view schematic illustration of the photograph of FIG. 5 showing the texture of the macroscopically three-dimensional outer surface of the first layer, and particularly the extended ridges on the outer surface of the first layer.
Figure 5:
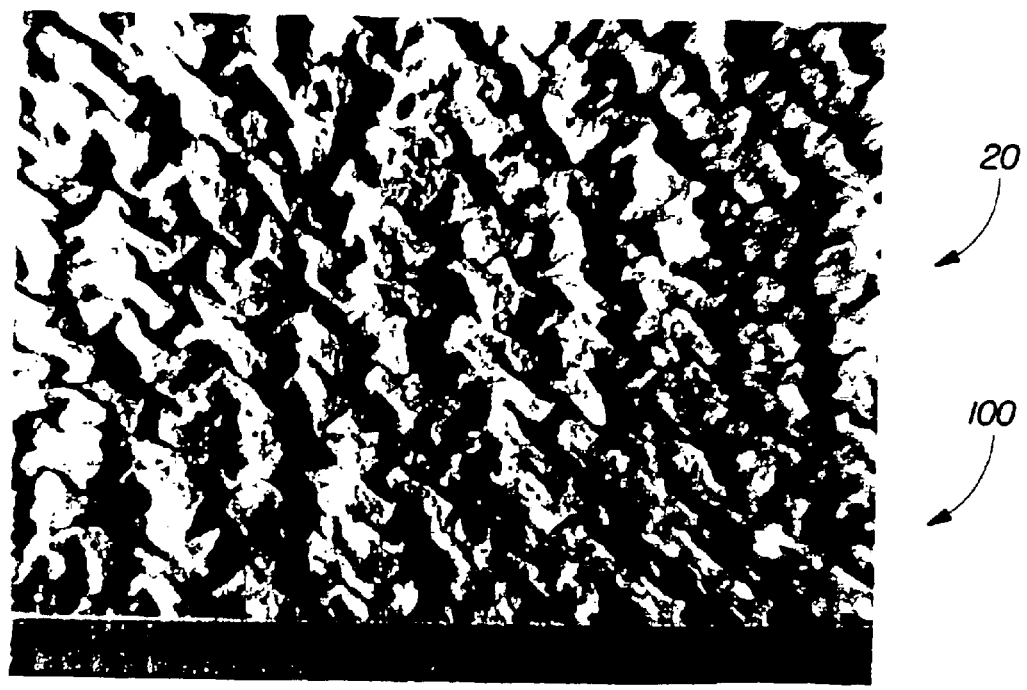
FIG. 5 is a photomicrograph showing the texture of the macroscopically three dimensional surface of the first layer, and in particular the elongated ridges of the surface. The scale in FIG. 5 is in inches.

FIG. 3 provides a schematic illustration of the surface texture of first layer 100 shown in the photograph of FIG. 5.

Figure 4:
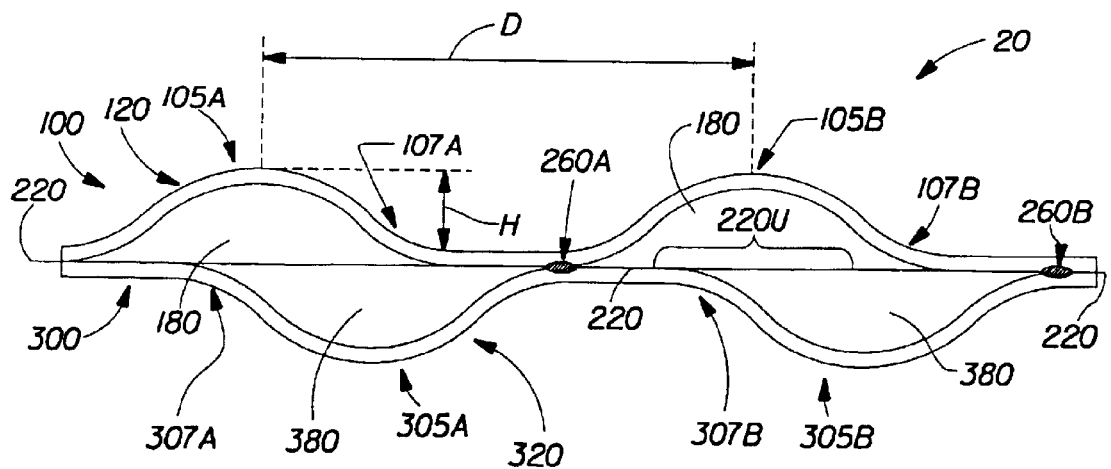
FIG. 4 is a cross-sectional illustration of the sheet taken parallel to one of the filaments of the second layer and showing portions of the filament extending intermediate the filament intersections, the portions of the filament that are not bound to the first layer, as well as portions of the filaments extending intermediate the filament intersections which are not bound to the third layer.
Figure 6:
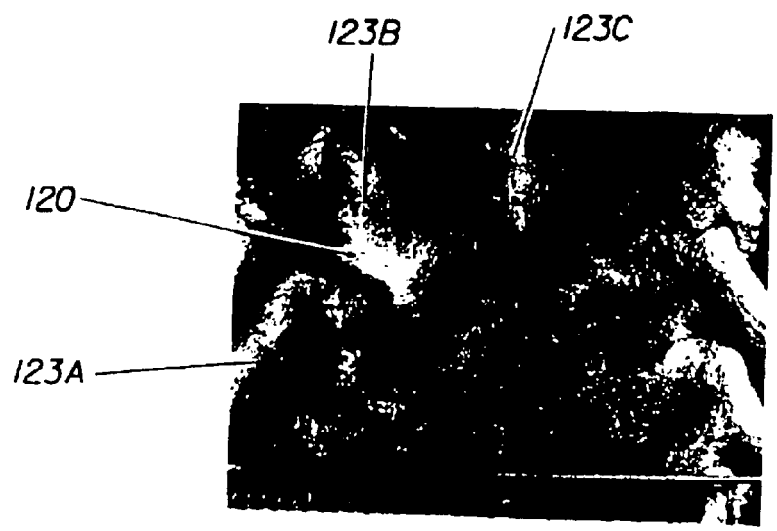
FIG. 6 is a enlarged photomicrograph of the type shown in FIG. 5 showing an elongated ridge having branches extending in different directions.
Figure 7:
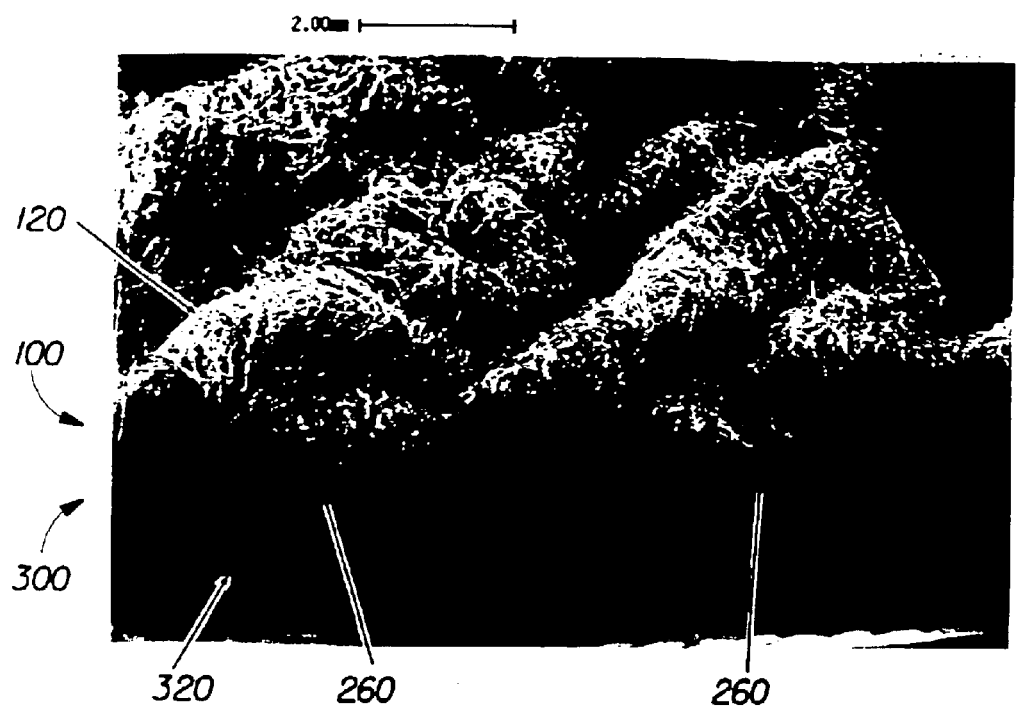
FIG. 7 is a Scanning Electron Micrograph providing a perspective view of the macroscopically three dimensional surface of the first layer.
Figure 8:
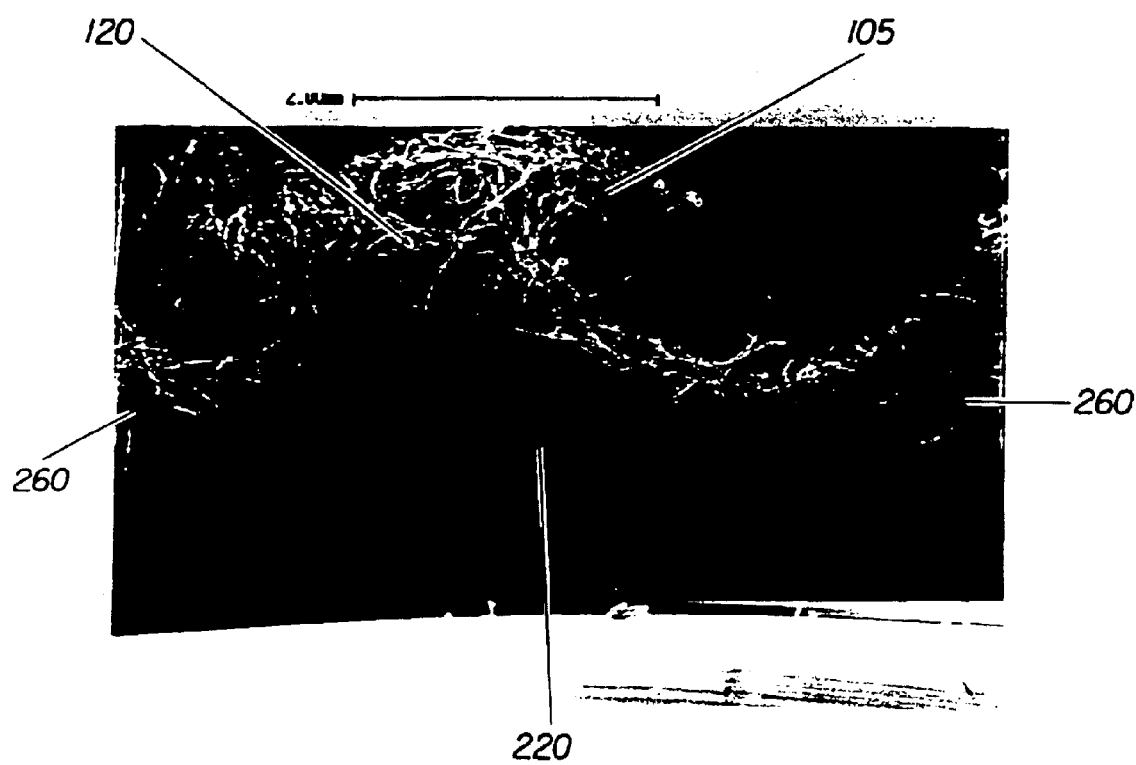
FIG. 8 is a Scanning Electron Micrograph of a cross-section of the cleaning sheet showing portions of filaments extending intermediate filament intersections, which portions of the filaments are unbonded to the first layer.

FIG. 4 provides a cross-sectional illustration of the surface texture of the first layer 100 and the third layer 300. FIG. 5 is a photomicrograph showing the texture of the macroscopically three dimensional surface of the first layer 100. FIG. 6 is a photomicrograph showing the three dimensional surface of the first layer 100 enlarged. FIG. 7 is a scanning electron micrograph providing a perspective view of the three dimensional surface of the first layer 100. FIG. 8 is a scanning electron micrograph of a cross-section of the sheet.

Referring to FIGS. 3–8, portions of the first layer 100 are gathered by contraction of the second layer 200 relative to the first layer 100. This gathering provides the first layer 100 with a macroscopically three dimensional surface as illustrated in FIG. 3–8. Likewise, the third layer 300 can be gathered by contraction of the second layer 200 to provide the third layer 300 with a macroscopically three dimensional surface.

The three dimensional surface of the first layer 100 has relatively elevated peaks 105 and relatively depressed valleys 107. The third layer has peaks 305 and valleys 307. In FIG. 4, the peaks of layer 100 are indicated with reference numbers 105A and 105B, and the valleys of layer 100 are indicated with reference numbers 107A and 107B. Similarly, the peaks of layer 300 are labeled 305A and 305B, and the valleys are labeled 307A and 307B. The peaks 105 provide elongated ridges 120 on the outward surface of the first layer 100, and the peaks 305 provide elongated ridges 320 on the outward surface of the third layer 300.

The macroscopic three-dimensionality of the outer surface of the first layer 100 can be described in terms of the "Average Height Differential" of a peak and an adjacent valley, as well as in terms of the "Average Peak-to-Peak Distance" between adjacent peaks. The height differential with respect to a peak 105A/valley 107A pair is the distance H in FIG. 4. The peak-to-peak distance between an adjacent pair of peaks 105A and 105B is indicated as distance D in FIG. 4. The "Average Height Differential" and the "Average Peak-to-Peak Distance" for the sheet are measured as set forth below in the Test Methods section. The "Surface Topography Index" of the outward surface is the ratio obtained by dividing the Average Height Differential of the surface by the Average Peak to Peak Distance of the surface.

Without being limited by theory, it is believed that the Surface Topography Index is a measure of the effectiveness of the macroscopically three-dimensional surface in receiving and containing material in the valleys of the surface. A relatively high value of Average Height Differential for a given Average Peak to Peak Distance provides deep, narrow valleys which can trap and hold materials. Accordingly, a relatively high value of Surface Topography Index is believed to indicate effective capture of materials during wiping.

The cleaning sheets of the present invention have the characteristic that portions of the filaments 220, portions of the filaments 240, or portions of both the filaments 220 and 240 of the second layer 200 are not bonded to the first layer 100. Referring to FIG. 4, a portion of a filament 220 extending intermediate filament intersections 260A and 260B is not bonded to the first layer 100. The portion of the filament 220 which is not bonded to the first layer 100 is indicated by reference number 220U. A gap between the filament 220 and the first layer 100 provides a void space 180 intermediate the first layer 100 and the filament 220. Similarly, portions of the filament 220 extending intermediate filament intersections 260 are not bonded to the third layer 300, thereby providing a void space 380 intermediate the third layer 300 and the filament 220.

FIGS. 7 and 8 also illustrate this characteristic of the sheet 20. In FIG. 7, elongated ridges 120 and 320 are visible on the outward surfaces of both the first and third layers 100, 300, respectively. In FIG. 8, a filament 220 is seen extending between two filament intersections 260. The portion of the filament extending between the two filament intersections is spaced from, and not bonded to, the first layer.

Ridges 120 are shown in plan view in FIG. 3 and FIG. 5. At least some of the ridges 120 extend across at least one filament of the second layer 200. In FIG. 4, the ridge 120 corresponding to peak 105A extends across at least one filament 220.

Because the ridges extend across one or more filaments, the ridges can have a length greater than the maximum distance between adjacent filament intersections 260 (the distance between adjacent filament intersections after contraction of layer 200 and gathering of layers 100 and 300). In particular, the length of the ridges 120 can be greater than the maximum dimension of the openings 250 in FIG. 1 (i.e. greater than the length of the diagonal extending across the rectangular openings 250). The length of a ridge 120 is indicated by the letter L in FIG. 3. The Length L is the straight line distance between two ends of a ridge 120, the ends of the ridge 120 being those points where a ridge 120 terminates at a valley 107.

The value of L can be at least about 1.0 centimeter, more particularly at least about 1.5 centimeter for some of the ridges 120. In one embodiment, at least some of the ridges 120 have a length L of at least about 2.0 centimeters. The length L can be at least twice the distance between adjacent filament intersections.

For instance, in order to determine the length of ridges 120 relative to the distance between adjacent filament intersections, the cleaning sheet 20 can be wetted and positioned on a light table or other suitable source of back lighting. Such back lighting, in combination with wetting of the cleaning sheet, can be used to make the filament intersections of the layer 200 visible through the layer 100, so that the lengths of ridges 120 relative to the distance between filament intersections can be measured with a scale.

The elongated ridges provide soft, deformable wiping elements for enhanced removal of material from the surface being cleaned. In contrast, if the filaments of the second layer were continuously bonded to the first and second layers, then any texture features of the first and third layers would be confined to the area associated with the openings 250 in the second layer 200.

At least some of the elongated ridges extend in a direction different from at least some of the other ridges. Referring to FIG. 3, the ridges 120A, 120B, and 120C each extend in a different direction. Accordingly, the sheet is effective in picking up material when the sheet is used to wipe in different directions.

FIGS. 3 and 6 also illustrate that at least some of the ridges 120 can have branches extending in different directions. In FIG. 3, a ridge 120 is shown having three branches 123A, 123B, and 123C extending in different directions. Likewise, FIG. 6 shows a ridge 120 having at least three branches labeled 123A, 123B, and 123C.

Figure 9:
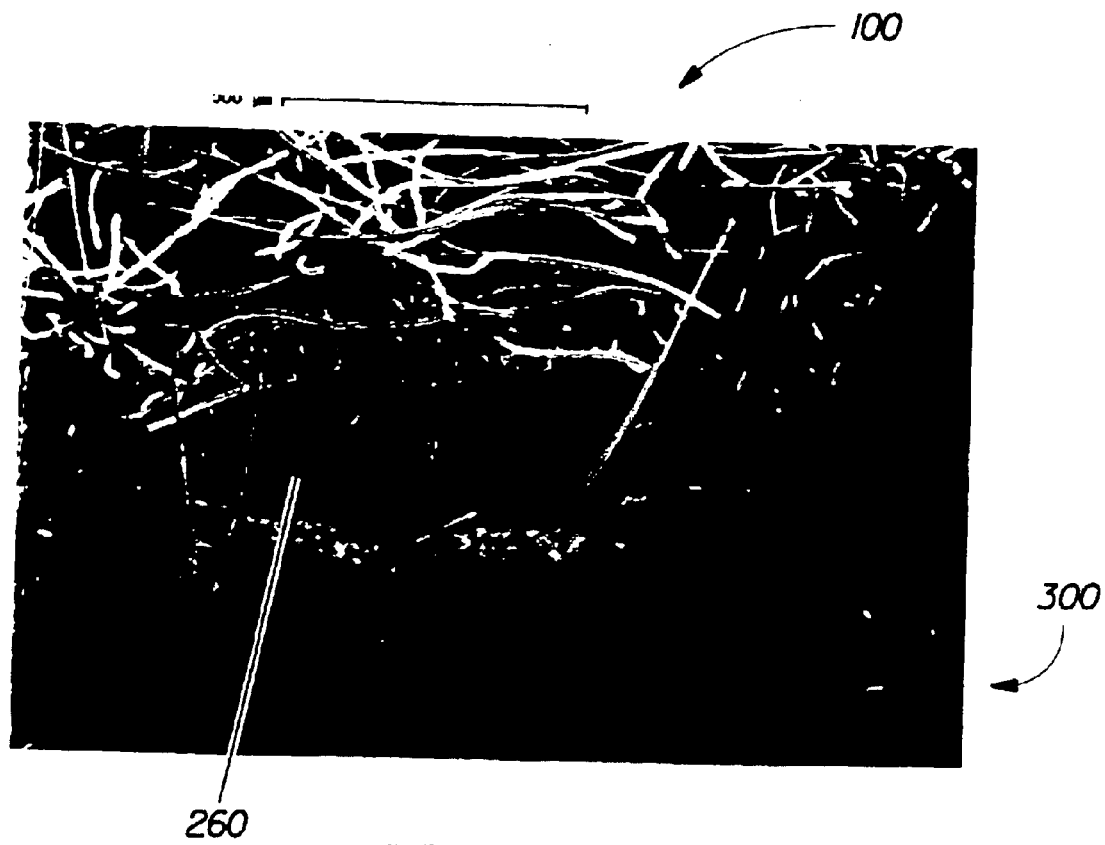
FIG. 9 is a Scanning Electron Micrograph showing bonding of the first and third layers to the second layer at the filament intersections.

The first layer 100 and the third layer 300 are securely bonded to the second layer 200 at the filament intersections 260. FIG. 9 illustrates the bonding of fibers of both the layers. 100 and 300 to the second layer at a filament intersection 260.

Referring to FIGS. 4, 7 and 8, the peaks 105 of the first layer 100 are generally offset from the peaks 305 of the third layer in the plane of the sheet 20. For instance, in FIG. 4 the peak 305A of the third layer does not directly underlie the peak 105A, but instead is generally aligned with the valley 107A associated with peak 105A. Accordingly, the peaks 105 of the first layer are generally aligned with valleys 307 of the third layer, and the peaks 305 of the third layer are generally aligned with valleys 107 of the first layer.

The present invention also includes a method for making a multiple layer cleaning sheets. A first nonwoven layer, a second layer comprising a net like arrangement of filaments, and a third nonwoven layer are provided. The first layer is positioned adjacent an upper surface of the second layer, in face to face relationship with the second layer. The third layer is positioned adjacent a lower surface of the second layer, in face to face relationship with the second layer.

The first layer and the third layer are then intermittently bonded to discrete, spaced apart portions of the second layer, such that portions of the filaments extending between filament intersections remain unbonded to the first layer, and such that portions of the filaments extending between filament intersections remain unbonded to the third layer. The second layer is contracted relative to the first layer and the third layer to provide a gathered, macroscopically three dimensional outward surface of the first layer, and a gathered, macroscopically three dimensional outward surface of the third layer. The steps of bonding and contracting can occur simultaneously, or in sequence.

The step of intermittently bonding the second layer to the first layer and the third layer can comprise the step of heated pressing of the first layer, the second layer, and third layer at a relatively low pressure for a relatively short time period to avoid relatively continuous bonding of the second layer to the first and third layers.

In one embodiment, the three layers can be joined using a BASIX B400 hand press manufactured by the HIX Corp. of Pittsburg, Kans. The three layers are joined by pressing in the hand press at a temperature of about 330° F. for about 13 seconds. The hand press has an adjustment for varying the clearance, and hence the pressure, provided in the press. The adjustment can be varied as desired to provide the desired texture in the layers 100 and 300.

c. Other Optional Aspects

The cleaning performance of any of the cleaning sheets of the present invention can be further enhanced by treating the fibers of the sheet, especially surface treating, with any of a variety of additives, including surfactants or lubricants, that enhance adherence of soils, and especially allergens, to the sheet. When utilized, such additives are added to the cleaning sheet at a level sufficient to enhance the ability of the sheet to adhere soils, especially allergens. Such additives are preferably applied to the cleaning sheet at an add-on level of at least about 0.01%, more preferably at least about 0.1%, more preferably at least about 0.5%, more preferably at least about 1%, still more preferably at least about 3%, still more preferably at least about 4%, by weight of the cleaning sheet. Typically, the add-on level is from about 0.1 to about 25%, more preferably from about 0.5 to about 20%, more preferably from about 1 to about 15%, still more preferably from about 3 to about 10%, still more preferably from about 4 to about 8%, and most preferably from about 4 to about 6%, by weight of the cleaning sheet. A preferred additive is a wax, an oil (e.g., mineral oil, petroleum jelly, etc.), or a mixture of an oil and a wax. Suitable waxes include various types of hydrocarbons, as well as esters of certain fatty acids (e.g., saturated triglycerides) and fatty alcohols. They can be derived from natural sources (i.e., animal, vegetable or mineral) or can be synthesized. Mixtures of these various waxes can also be used. Some representative animal and vegetable waxes that can be used in the present invention include beeswax, carnauba, spernaceti, lanolin, shellac wax, candelilla, and the like. Representative waxes from mineral sources that can be used in the present invention include petroleum-based waxes such as paraffin, petrolatum and microcrystalline wax, and fossil or earth waxes such as white ceresine wax, yellow ceresine wax, white ozokerite wax, and the like. Representative synthetic waxes that can be used in the present invention include ethylenic polymers such as polyethylene wax, chlorinated naphthalenes such as "Halowax," hydrocarbon type waxes made by Fischer-Tropsch synthesis, and the like.

When a mixture of mineral oil and wax is utilized, the components will preferably be mixed in a ratio of oil to wax of from about 1:99 to about 7:3, more preferably from about 1:99 to about 1:1, still more preferably from about 1:99 to about 3:7, by weight. In a particularly preferred embodiment, the ratio of oil to wax is about 1:1, by weight, and the additive is applied at an add-on level of about 5%, by weight. A preferred mixture is a 1:1 mixture of mineral oil and paraffin wax.

Particularly enhanced cleaning performance, including an enhanced ability to remove allergens from a surface, is achieved when multiple basis weights, macroscopic three-dimensionality and additive are provided in a single cleaning sheet. As discussed hereinbefore, these low levels are especially desirable when the additives are applied at an effective level and preferably in a substantially uniform way to at least one discrete continuous area of the sheet. Use of the preferred lower levels, especially of additives that improve adherence of soil, especially allergens, to the sheet, provides surprisingly good cleaning, dust suppression in the air, preferred consumer impressions, especially tactile impressions, and, in addition, the additive can provide a means for incorporating and attaching perfumes, pest control ingredients, antimicrobials, including fungicides, and a host of other beneficial ingredients, especially those that are soluble, or dispersible, in the additive. These benefits are by way of example only. Low levels of additives are especially desirable where the additive can have adverse effects on the substrate, the packaging, and/or the surfaces that are treated.

The application means for these additives preferably applies at least a substantial amount of the additive at points on the sheet that are "inside" the sheet structure. It is an especial advantage of the three dimensional structures and/or multiple basis weights, that the amount of additive that is in contact with the skin and/or surface to be treated, and/or the package, is limited, so that materials that would otherwise cause damage, or interfere with the function of the other surface, can only cause limited, or no, adverse effects. The presence of the additive inside the structure is very beneficial in that soil that adheres inside the structure is much less likely to be removed by subsequent wiping action.

The present cleaning sheets preferably generate electrostatic forces to assist in the pick-up and retention of soil and dust, especially allergens.

In one particularly preferred embodiment, a cleaning sheet is prepared by: introducing a first layer of carded polyester (e.g., 19 g/m² basis weight) on a carrier belt, laying a netted scrim material on top of the first layer, and laying a second, randomized layer of carded polyester fiber web (28 g/m² basis weight) on top of the netted scrim material. (It should be recognized that either or both of the first and second layers may be formed from multiple layers of carded polyester.) The three-layer composite is then subjected to hydroentanglement on a mesh forming belt consisting of strands or filaments running in the MD and CD directions. This results in hydroentanglement of the two carded layers of fiber, as well as entanglement of each of the fibrous layers with the scrim material. The entangled composite is then subjected to heat during the drying process, which results in approximately 20% shrinkage of the sheet in the CD direction. This shrinkage results in the bottom layer having an estimated basis weight of 23.75 g/m² and the top layer having an estimated basis weight of 35 g/m². After final cutting, the sheet is coated on both surfaces with a 5%, by dry weight of the sheet, mixture of mineral oil and paraffin wax (1:1 w/w ratio). The aggregate basis weight of the sheet (including the scrim material), after coating, is from about 64 to 68 g/m².

III. Cleaning Implements Useful for Removing Allergens from Surfaces

In another respect, the present invention relates to a cleaning implement useful for removing allergens from a surface comprising the cleaning sheets discussed herein. In one aspect, the cleaning implement comprises:

a. a handle; and b. a removable cleaning sheet, preferably a hydroentangled nonwoven cleaning sheet, more preferably comprising one or more high basis weight regions having a basis weight of from about 30 to about 120 g/m² and one or more low basis weight regions, wherein the low basis weight region(s) have a basis weight that is not more than about 80% of the basis weight of the high basis weight region(s).

As discussed above, in this aspect of the invention, it is preferred that sheet of the cleaning implement have a continuous region surrounding discrete regions that differ with regard to basis weight. Particularly preferred is where the continuous region has a relatively higher basis weight than the discrete regions. The sheet aspect of the implement may also exhibit macroscopic three-dimensionality.

The implement and, separately, the cleaning sheet of the present invention are designed to be compatible with all hard surface substrates, including wood, vinyl, linoleum, no wax floors, ceramic, FORMICA® D, porcelain, and the like.

The handle of the cleaning implement comprises any elongated, durable material that will provide ergonomically practical cleaning. The length of the handle will be dictated by the end-use of the implement. A handle useful in the present invention is shown and described in U.S. Design Pat. No. D409,343, issued May 4, 1999 to Kingry et. al., which is hereby incorporated by reference.

The handle will preferably comprise at on cleaning sheet can be releasably attached. To facilitate ease of use, the support head can be pivotably attached to the handle using known joint assemblies. Any suitable means for attaching the cleaning sheet to the support head may be utilized, so long as the cleaning sheet remains affixed during the cleaning process. Examples of suitable fastening means include clamps, hooks & loops (e.g., VELCRO®), and the like. In a preferred embodiment, the support head will comprise means for gripping the sheet on its upper surface to keep the sheet mechanically attached to the head during the rigors of cleaning, such as that described in co-pending U.S. application Ser. No. 09/374,714 filed Aug. 13, 1999, which is hereby incorporated by reference. However, the gripping means will readily release the sheet for convenient removal and disposable.

The cleaning sheets useful in the cleaning implement of the present invention are as described above.

IV. Articles of Manufacture Useful for Removing Allergens from Surfaces

The present invention also relates to articles of manufacture that are useful for removing allergens from surfaces. The present articles typically comprise packages containing cleaning sheets, such as those described hereinbefore, the packages being in association with information or instructions that will inform the consumer, by words and/or by pictures, that use of the sheets will provide cleaning benefits which include soil (e.g., allergens, dust, lint, etc.) removal and/or entrapment and this information can comprise the claim of superiority over other cleaning products. Since many consumers are particularly sensitive to allergens, it is important to information or instructions as to the ability of the cleaning sheets to remove allergens from surfaces, especially emphasizing the large percentage of allergens removed from surfaces by wiping the surface with the present cleaning sheets. As used herein, the phrase "in association with" means the information or instructions are either directly printed on the package itself or presented in a different manner including, but not limited to, promotional material, so as to communicate the information or instructions to a consumer of the article of manufacture. The information or instructions are important to encourage consumers, especially those who are sensitive to allergens and who might not otherwise use the cleaning sheets, to use them.

In a highly desirable variation, the package bears the information that informs the consumer that the use of the cleaning sheet provides reduced levels of allergens, dust and other airborne matter in the atmosphere. It can also be very important that the consumer be advised of the potential to use the sheets on non-traditional surfaces, including fabrics, pets, etc., to ensure that the full benefits of the sheets is realized. Accordingly, the use of packages in association with information that will inform the consumer, by words and/or by pictures, that use of the compositions will provide benefits such as reduction of allergens on surfaces, improved cleaning, reduction of particulate soil in the air, etc. as discussed herein, is important. The information can include, e.g., advertising in all of the usual media, as well as statements and icons on the package, or the sheet itself, to inform the consumer.

The prior cleaning sheet products, such as those described in the '397 patent, which is incorporated by reference herein, which do not comprise the preferred structures herein can be used to provide the benefits in a lesser degree, and to the extent that these benefits have not been previously recognized, they should be included in the information provided. Otherwise, the consumer will not obtain the full value of the improved performance relative to conventional products or practices. As such, the present articles also encompass these cleaning sheets in packages in association with information or instructions as described herein, especially information or instructions relating to the ability of the cleaning sheets to remove allergens from surfaces.

It can also be important to provide information regarding the amount of allergens removed from a surface by wiping a surface with the present cleaning sheets. The present cleaning sheets, especially hydroentangled nonwoven cleaning sheets comprising an additive adhered thereto, tend to remove a large percentage of allergens from surfaces. Typically, the present cleaning sheets remove at least about 88%, preferably at least about 90%, and more preferably at least about 93% of allergens from a surface by wiping the surface with a cleaning sheet. This amount of allergen removal can typically be achieved with only a single pass of the cleaning sheet over the surface being cleaned. Information regarding the amount of allergen removal of the cleaning sheets can be important to consumers because consumers who might not otherwise use the cleaning sheets could be motivated to use the sheets if informed of the allergens removed from surfaces by the present cleaning sheets, preferably the relatively high percentage of allergens removed.

The information provided can be further directed to specific allergens, since consumers can be sensitive to certain allergens, but not to others. Examples of allergens to which consumers tend to be sensitive include, but are not limited to, dust mite allergens (commonly referred to as "Der p 1" or "Der f 1" or "Der p 2" or "Der f 2"), cat allergens (commonly referred to as "Fel d"), dog allergens (commonly referred to as "Can f 1"), mold allergens (commonly referred to as "Asp f 1" or "Alt a 1" or "Cla h 1"), cockroach allergens (commonly referred to as "Bla g 1" or "Bia g 2"), pollen allergens, and the like. Such allergens are commonly found in the typical household environment.

It can be of further importance to provide information regarding the superior allergen removal ability of the present cleaning sheets compared to more traditional cleaning devices such as traditional dust mops or traditional brooms.

The information provided can comprise a statement regarding the electrostatic forces generated by the cleaning sheet, implement, and/or article of manufacture. This information can further comprise a statement relating the electrostatic forces to the ability of the cleaning sheet, implement, and/or article to remove allergens from surfaces.

The information can comprise a set of instructions comprising an instruction to wipe a surface with a present cleaning sheet to remove allergens from the surface, preferably the instruction to remove at least about 88%, preferably at least about 90%, and more preferably at least about 93% of allergens from the surface. The set of instructions can further comprise a variety of other information described herein.

The information can also comprise an instruction to use the present cleaning sheet in combination with an allergy-related product. The present cleaning sheets can be used by wiping a surface with the sheet to remove allergens, as well as soil, dirt, dust, and the like.

The information can further include an instruction to throw the present cleaning sheet away after it is used, such that the allergens collected on the sheet are thrown away with the sheet and are thus removed from the consumer's living environment.

The information provided can also provide an instruction to wipe elevated surfaces, especially walls, ceilings, ceiling fans, shelves, and the like, with the present cleaning sheets, implements, and/or articles. This information can be especially useful in association with packages containing the present cleaning implements, since the preferred implements of the present invention comprise an elongated handle to reach elevated surfaces. Also, when soil and dust is removed from elevated surfaces, the soil and dust are typically stirred up into the air, and the present cleaning sheets are able to minimize this effect.

The information described herein can also be in association with packages containing the present cleaning implements as described herein.

Packages which are useful in the present invention for holding cleaning sheets include cartons, flow wrap films, resealable film packages, resealable cartons, plastic tubs, and the like. Preferred packages are recloseable cartons such as those described in co-pending U.S. application Ser. No. 09/374,715 filed Aug. 13, 1999 by Hardy, which is hereby incorporated by reference.

V. Methods of Promoting the Sale of Cleaning Sheets, Implements, or Articles Useful for Removing Allergens from Surfaces The present invention also relates to a method of promoting the sale of the present cleaning sheets, implements, or articles of manufacture that are useful in removing allergens, preferably a large percentage of allergens, from a surface. The present methods generally comprise providing promotional materials to consumers by a variety of steps to inform them of the allergen removal benefits of the present cleaning sheets, implements, and articles. The promotional materials, as described hereinbefore, of the present methods typically comprise information, as described herein, regarding the allergen removal benefits of the present cleaning sheets, implements, and articles of manufacture.

The present methods are especially important to improve the health of consumers because with the present methods, consumers who otherwise might not use the cleaning sheets, implements, and/or articles of the present invention, especially consumers who suffer from allergies, will be informed of the allergen removal benefit of the present cleaning sheets and be motivated to use them to remove allergens from surfaces. This reduces the amount of allergens, as well as airborne particulates, in the environment around the consumer and relieves the consumer's allergic reactions, leading to a more healthy environment for the consumer.

In one embodiment, a typical method comprises a method of promoting the sale of a cleaning sheet (preferably a hydroentangled nonwoven cleaning sheet comprising an additive preferably selected from the group consisting of a wax, an oil, and mixtures thereof), useful for removing allergens from surfaces comprising the steps of (a) displaying, shelving, or merchandising a cleaning sheet (preferably a nonwoven cleaning sheet comprising an additive), in a pharmaceutical department of a retail store; and/or (b) providing promotional materials to consumers, wherein said promotional materials comprise information regarding the cleaning sheet's ability to remove allergens from surfaces and/or an instruction to relieve allergy symptoms and/or remove allergens from surfaces by wiping a surface, preferably a household surface, with the cleaning sheet.

In another embodiment, the method includes providing promotional materials to a medical care professional, preferably a physician, more preferably a physician specializing in the treatment of allergy-related symptoms, who then provides the promotional materials to his or her patient, preferably one who suffers from allergies. Since a patient and/or consumer with allergy symptoms tends to visit his or her medical care professional regularly, this method of promoting the sale of the present cleaning sheets is particularly effective because these consumers typically experience great discomfort due to their allergies and might be influenced to use a product that they otherwise would not use if they were unaware of the allergen removal benefits of the present cleaning sheets, thereby relieving some of their pain and/or suffering. A patient brochure useful in the present methods is provided in Example 7.

In another embodiment, the method includes sending promotional materials directly to consumers via regular mail or electronic mail. Preferably the consumers suffer from allergy-related symptoms. The promotional materials can also include samples of the cleaning sheets, implements, or articles and can preferably include discount coupons which the consumer can redeem upon purchasing the present cleaning sheets, implements, or articles.

In another embodiment, the present method of promoting the sale of a cleaning sheet for removing allergens from a surface comprises the steps of (a) providing promotional material to a pharmacist, wherein the promotional material comprises information regarding an ability of said cleaning sheet to remove allergens from said surface; and/or (b) having the pharmacist provide the promotional material to a prescription drug consumer when the prescription drug consumer receives a prescription drug for allergies from said pharmacist to inform said prescription drug consumer of an ability of said cleaning sheet to remove allergens from a surface. Since the prescription drug consumer is already receiving a prescription drug, preferably for the treatment of allergy symptoms, providing the promotional material at the point-of-sale of the prescription drug is important to draw the consumer's attention to the ability of the cleaning sheets, implements, and/or articles to remove allergens from surfaces. This can motivate the consumer to use the cleaning sheets, implements, and/or articles, which they otherwise might not use, leading to a more healthy environment around the consumer. Preferably, the prescription drug is selected from the group consisting of: antihistamines (such as loratadine available from Schering under the trade name CLARITIN®; cetirizine hydrochloride available from Pfizer under the trade name ZYRTEC®; and fexofenadine hydrochloride available from Hoechst Marion Roussel under the trade name ALLEGRA®); antiinflammatory drugs (such as nedocromil sodium available from Rhone-Poulenc under the trade name TILADE®); glucocorticosteroids (such as triamcinolone acetonide available from Rhone-Poulenc under the trade name NASACORR®; beclomethasone dipropionate available from Glaxo Wellcome under the trade name BECLOVENT®; and fluticasone propionate available from Glaxo Wellcome under the trade name FLONASE®); beta-adrenergics (such as albuterol available from Schering under the trade name PROVENTIL®, or available from Glaxo Wellcome under the trade name VENTOLIN®; and albuterol sulfate available from Schering under the trade name PROVENTIL®, or available from Glaxo Wellcome under the trade name VENTOLIN®; leukotriene modifiers or antagonists (such as zafirlukast available from Zeneca under the trade name ACCOLATE®), and combinations thereof.

In another embodiment, the present method of promoting the sale of a cleaning sheet for removing allergens from a surface to a purchaser of an allergy-related product comprises the steps of (a) identifying the purchaser of an allergy-related product; and/or (b) providing promotional material to the purchaser, wherein the promotional material comprises information regarding the ability of the cleaning sheet, implement, and/or article to remove allergens from a surface and/or a discount coupon redeemable upon purchase of said cleaning sheet. The promotional material is preferably provided to the purchaser of the allergy-related product at the point-of-sale of the allergy-related product. Preferably, the purchaser of the allergy-related product is identified by as system, more preferably a computer system, for printing the promotional material (such as the information and/or discount coupon as described herein) in a store in response to the purchase of the allergy-related product. The system can be programmed such that the sale of the allergy-related product triggers the printing of the promotional material regarding the present cleaning sheets, implements, and/or articles. Suitable systems for the present methods are described in more detail in U.S. Pat. No. 4,723,212 issued Feb. 2, 1988 to Mindrum et al.; U.S. Pat. No. 5,592,560 issued Jan. 7, 1997 to Deaton et al.; U.S. Pat. No. 5,687,322 issued Nov. 11, 1997 to Deaton et al.; U.S. Pat. No. 5,832,457 issued Nov. 3, 1998 to O'Brien et al.; each of which are hereby incorporated by reference in their entirety.

The methods of the present invention of promoting the sale of the present cleaning sheets, implements, and/or articles of manufacture motivate consumers to use the present sheets, implements, and articles by communicating their allergen-removal benefits. Without this information, consumers might not otherwise use the present cleaning sheets, implements, or articles, thereby missing an opportunity to create a more healthy environment.

VI. Test Methods

A. Caliper Method

To prevent structural alteration of the sample, the sample should be freeze-fractured to provide a cross sectional image of the low and high basis weight regions. The cross section microscopy image of the sample can be used to determine relative caliper differences between regions.

B. Average Height Differential

Average Height Differential is determined using a light microscope (e.g., Zeiss Axioplan, Zeiss Company, Germany) equipped with a Z-dimension measuring device (e.g., Microcode II, sold by Boeckeler, Instruments). This procedure involves locating a peak or valley region of the sheet, focusing the microscope and zeroing the Z-dimension measuring device. The microscope is then moved to an adjacent valley or peak region, respectively, and the microscope is refocused. The display of the instrument indicates the height difference between this peak/valley or valley/peak pair. This measurement is repeated at least 10 times, at random locations on the sheet, and the Average Height Differential is the average of these measurements.

C. Average Peak-to-Peak Distance

Simple light microscopy can be used to measure average peak-to-peak distance.

The magnification used should be sufficient to readily measure the distance between two adjacent peaks. This measurement is repeated at least 10 times, at random locations on the sheet, and the Average Peak-to-Peak Distance is the average of these measurements.

D. CD Eloniation at 500 g

CD elongation is a measure of the percent elongation a test sample exhibits under a load of 500 g. CD Elongation can be measured using a Sintech Renew Instron 7310 (including the Testworks software package) with a 100 N load cell. Using this instrument, a Load vs. % Strain curve is generated. The testing parameters are as follows:

Sample width=30 mm

Gauge Length=100 mm

Crosshead speed=300 mm/min

From the curve generated, the software obtains the % Strain (% Elongation) at a load of 500 g. This is reported as CD Elongation at 500 g.

E. Allergen Removal

The amount of allergens removed from a surface contacted by a cleaning sheet of the present invention, as well as by traditional cleaning devices, is measured according to the following Test Method. A dust. exposure system comprises a 10×11 foot tent, fitted with stirring fans, a dust blower/diffuser, and vinyl support floor panels. An access flap running the length of the tent allows vinyl panels to slide in and out.

In preparation for testing, the vinyl panels are cleaned with 20% isopropyl alcohol, and then dried with a clean cloth. The vinyl panels are then wiped over once with a SWIFFER™ brand cleaning sheet to standardize the surface charge. The stirring fans are turned on, and 5×8 foot clean vinyl flooring is placed in the exposure enclosure, with five pre-weighed 1 ft$^2$ control squares placed in the selected control areas.

The dust used in this test method consists of the following: 0.50 g of vacuum cleaner soil (i.e. dirt collected from vacuum cleaner bags), 0.50 g of fluffy soil (composed of a 50/50 mix of finely shredded cellulose and vacuum cleaner soil), and 0.02 g of pet hair. The dust is then spiked with 20 micrograms of a specific allergen per gram of dust.

Nine hundred milligrams of the prepared dust is added to the dust blower, and the dust blower activated for 45 seconds. The stirring fans are then turned off, and a 5 minute period allows for dust to settle. This procedure is then repeated using another 900 mg of the same dust.

After losses, the amount of dust equates to an average of about 29 mg of dust per square foot of vinyl flooring. After settling, the five control squares are removed from the exposure enclosure, re-weighed to check loading is within desired boundaries, and swabbed to sample the allergen load according to the swabbing procedure described below. The vinyl section is carefully removed from the exposure enclosure and slid onto the external vinyl support floor panels.

The section of flooring is then cleaned using the cleaning device to be tested. The cleaning device is pre-weighed. The cleaning device is then moved across the surface of the flooring in a sigmoid pattern across the short axis of the vinyl flooring, turning at each end so that the leading edge is maintained. A 5 cm overlap is made on each successive stroke. After 8 strokes, the leading edge is reversed and the sigmoid pattern continued. Another 9 strokes are required for full coverage. Another 2 strokes are made along each long edge of the vinyl to cover the turning points. The cleaning device is then re-weighed and retained for later analysis.

Fifteen 1 ft$^2$ pre-determined test sections of the vinyl flooring are then swabbed according to the swabbing procedure described below. Test sections are identified by their alphanumeric co-ordinates, as shown in the following diagram:

| | | | | | | | | |
|---|---|---|---|---|---|---|---|---|
| E | Control Square | Test | | | Test | Control Square | | |
| D | Test | Test | | | Test | Test | | |
| C | | | Test | Control Square | | | | |
| B | Control Square | Test | Test | Test | Test | Control Square | | |
| A | Test | Test | | | Test | Test | | |
| 1 | 2 | 3 | 4 | 5 | 6 | 7 | 8 | |

Swabbing Procedure

The five control squares and the 15 test squares are each swabbed with a 1 ml liquot of extraction buffer on a 2.75 inch×3 inch piece of sterile medical gauze. The gauze is folded in half, wetted with 1 ml of extraction buffer and the vinyl swabbed, first sing five strokes along the X-dimension then five strokes along the Y-dimension. Between the X-dimension and Y-dimension strokes, the gauze is opened and refolded the opposite way, to expose a fresh section of the gauze.

The gauze is then placed in a 10 ml centrifuge tube, and is seated on a pedestal within the centrifuge tube, to enable supernatant recovery, and a further 1 ml aliquot of extraction buffer is added to the tube. The allergen is then left to elute from the dust on the swab for 24 hours.

Following elution, the centrifuge tube is centrifuged at 3000g for 10 minutes to recover the supernatant. The supernatant samples are then frozen at −20° C. until required for Enzyme-Linked 1 mmuno Sorbent Analysis ("ELISA"), which is conducted using commercially available kits that allow for detection and measurement of a variety of proteins, in this case the allergen of interest.

The samples are then analysed by ELISA for Der p1 (dust mite), Fel d 1 (cat), and Can f 1 (dog) allergens. The mean percentage of allergen remaining after the use of the cleaning device is calculated for each of the allergens assayed. For each sector of 4 squares (1 control square and 3 test squares) the percentage of allergen remaining on each test square after cleaning is calculated with reference to the adjacent control square.

VII. Representative Examples

The following are illustrative examples of cleaning sheets, implements, articles and methods of the present invention. Where applicable, mechanical properties of the sheets are summarized in Table I. Where applicable, enhanced three dimensionality is indicated in Table II.

EXAMPLE 1

This example illustrates the combination of carded webs and a scrim (i.e., a net of polypropylene filament) to make a cleaning sheet of the present invention. Two carded polyester fiber webs with a scrim in between is prepared. The combination of the two carded webs and the scrim are then placed on top of an apertured forming belt (23C square weave available from Albany International, Engineered Fabrics Division, Appleton, Wis.) and are hydroentangled and dried. The water entangling process causes the fibers to become intertangled and to also become intertangled with the scrim, while causing the fibers to move apart and provide two distinct basis weight regions. During the drying process, the hydroentangled sheet becomes "quilted" (i.e., greater three dimensionality is achieved) as a result of shrinkage of the polypropylene scrim relative to the polyester nonwoven. This material is designated as Example 1 in Table 1 and Table 2.

As a preferred optional step, the nonwoven sheet is surface coated (by, e.g., printing, spraying, etc.) with 5%, by weight, of a 1:1 mixture of mineral oil and paraffin wax. This treated sheet is designated as Example 1A in Table 1.

As another preferred optional step, the entangled nonwoven sheet may be subjected to further heating, for example in a press at 180° C. for 10 sec. (This heating may be performed before or after adding the surface treatment, but is preferably conducted prior to application of the additive.) This provides even further enhanced three-dimensionality, similar to that of the sheet described in Example 3. This sheet is designated as Example 1B in Table 1 and Table 2.

EXAMPLE 2

This example illustrates the hydroentanglement of two layers of carded fibers (polyester), wherein no scrim material is positioned between the two fibrous layers. The fabric belt and both hydroentangling and drying conditions are similar to Example 1. This material is designated as Example 2 in Table 1.

EXAMPLE 3

A cleaning sheet according to the present invention includes a first layer 100, a second layer 200, and a third layer 300. The first layer 100 and the third layer 300 each comprise a hydroentangled web of polyester fibers having a basis weight of about 30 grams per square meter. The second layer comprises the above described THERMANET ® brand reinforcing netting having a polypropylene/EVA, resin, 2 sided adhesive, and a filament count of 3 filaments per inch by 2 filaments per inch prior to contraction of the second layer. The second layer 200 is positioned between the first layer 100 and the third layer 300 in a BASIX B400 hand press. The three layers are joined by pressing in the hand press at a temperature setting of about 330° F. for about 13 seconds.

EXAMPLE 4

Example 4 illustrates a nonwoven sheet having a uniform basis weight. A forming belt with fine openings (e.g., 100 mesh) can be used to make this sheet. The combination of carded web and scrim was hydroentangled and dried. This fabric belt provides very uniform basis weight to the sheet due to very fine openings of the belt. The nonwoven sheet is surface coated (by, e.g., printing, spraying, etc.) with 5%, by weight, of a 1:1 mixture of mineral and paraffin wax.

EXAMPLE 5

Example 5 illustrates a nonwoven sheet having a uniform basis weight and is generally planar. The sheet is commercially available from Kao Corporation, Tokyo, Japan, under the trade name QUICKLE™, and from S. C. Johnson, Racine, Wis., USA, under the trade name GRAB-IT™. Thesecleaning sheets are useful in the present cleaning implements, articles and methods to remove allergens from surfaces, albeit to a lesser degree than the cleaning sheets described in Examples 1–3.

TABLE 1

| Example # | Chemical add on (%) | Density (g/cm3) | Basis Weight (gsm) | Caliper (mil) | CD Tensile (g/30 mm) | CD Elongation at 500 g (%) | MD Tensile (g/30 mm) | MD elongation at 500 g (%) |
|---|---|---|---|---|---|---|---|---|
| 1 | 0 | 0.07 | 63 | 36 | 3620 | 6.5 | >10,000 | 3.3 |
| 1A | 5 | 0.07 | 66 | 39 | 2418 | 6.9 | 7594 | 3.5 |
| 1B | 5 | 0.04 | 136 | 127 | 4437 | 11.2 | >10,000 | 9.8 |
| 2 | 0 | 0.06 | 63 | 42 | 6188 | 31 | >10,000 | 9.6 |
| 4 | 5 | 0.11 | 68 | 24 | 2643 | 5.5 | 7633 | 1.9 |

N = 3 for all measurements.

TABLE II

| Example # | Average Height Differential (mm) | Average Peak to Peak Distance (mm) | Surface Topography Index |
|---|---|---|---|
| 1 | 0.74 | 0.89 | 0.8 |
| 1B | 1.4 | 3.0 | 0.5 |
| 3 | 1.8 | 3.0 | 0.6 |
| 5 | 0.14 | 0.85 | 0.16 |

EXAMPLE 6

This example illustrates the ability of the present cleaning implements, sheets and articles to remove allergens from a surface, which is compared to that of traditional dust mops and brooms. Each cleaning device is tested according to the Allergen Removal Test Method described hereinbefore in Section VI.E. Two cleaning sheets of the present invention are tested according to this Test Method. The first cleaning sheet is a hydorentangled nonwoven cleaning sheet comprising about 5% of an additive comprising a 1.1 ratio of mineral oil:paraffin wax and is produced according to the process described in Example 1. This cleaning sheet is referred to as "Cleaning Sheet #6" and is commercially available from the Procter & Gamble Company under the trade name SWIFFER™. The second cleaning sheet is a spunbonded, polypropylene cleaning sheet comprising a mineral oil additive. This cleaning sheet is referred to as "Cleaning Sheet #7" and is commercially available from the Casallegra BBS Company under the trade name VELO MAGICO™. These cleaning sheets are removably attached to a handle to form a cleaning implement as described hereinbefore and tested as such. The traditional cleaning devices in Table III are also tested according to the same Test Method for comparative purposes:

TABLE III

| DEVICE | COMPANY | TRADE NAME |
|---|---|---|
| Broom with Nylon Bristles | Rubbermaid | <None> |
| Broom with Foam Broom Head | Vileda | SCOPA |
| Broom with Rubber Bristles | Vileda | SCOPA GOMMA |
| Dust Mop with Looped Cotton Strings | Rubbermaid | <None> |
| Dust Mop with Chamois-Type Head Cover | Vileda | FIBRETTA |

Each cleaning device is tested according to the Allergen Removal Test Method and the results are reported in Table IV as follows:

TABLE IV

| Cleaning Device | DUST MITE (Der p 1) | | CAT (Fel d 1) | | DOG (Can f 1) | |
|---|---|---|---|---|---|---|
| | % Left Behind | % Collected | % Left Behind | % Collected | % Left Behind | % Collected |
| Cleaning Sheet #6 | 5.3 | 94.7 | 6.6 | 93.4 | 6.4 | 93.6 |
| Cleaning Sheet #7 | 9.6 | 90.4 | 8.6 | 91.4 | 18.2 | 81.8 |
| Brooms | | | | | | |
| Rubbermaid | 66.5 | 33.5 | 84.3 | 15.7 | 86.2 | 13.8 |
| Vileda Scopa ™ | 95.6 | 4.4 | 114.6 | 0 | 179.0 | 0 |
| Scopa Gomma ™ Dust Mops | 34.3 | 66.7 | 41.3 | 57.8 | 22.2 | 77.8 |
| Rubbermaid | 58.6 | 41.4 | 87.5 | 12.5 | 72.4 | 27.6 |
| Vileda Fibretta ™ | 15.3 | 84.7 | 17.3 | 82.7 | 12.1 | 87.9 |

These results demonstrate that the present cleaning sheets remove relatively large percentages of allergens from a surface, especially compared to traditional cleaning devices.

EXAMPLE 7

This example illustrates promotional material comprising a patient brochure. The patient brochure comprises a cover, five inside panels, a coupon panel, and a back panel. The contents of the brochure are as follows:
(Cover)
FIGHTING ALLERGENS IN YOUR HOME
Helpful
TIPS
From SWIFFER (Logo)®
(Inside Panel 1)
   What is an allergy?
   If you have an allergy, your immune system, which usually protects your body from harmful substances like viruses and bacteria, is supersensitive to otherwise harmless "allergens" from dust mites, animal dander, plant pollens or specific foods.
   An overreaction to these substances may cause allergy symptoms in an allergic individual.
   Allergy symptoms can include
      watery eyes
      a stuff, runny nose
      itchy, dry skin or hives
      bronchoconstriction
   Allergy symptoms can cause asthma.
© 1999 Procter & Gamble
(Inside Panel 2)
   Allergens are common in every home
   Every home has "house dust"
      House dust doesn't only blow in from outdoors
      It's also produced from
         The breakdown of fibers and other materials in the home
         Human skin cells
         Pet dander and saliva
         Microscopic dust mites
   Dust mite waste is typically the most common household allergens.
   Almost as common are allergens in the dander, saliva and hair of cats and other animals with fur or feathers. Pet allergens can be present even in households without pets.
   Other common indoor allergens are mold and mildew, and even cockroach waste.
© 1999 Procter & Gamble (Inside Panel 3)
What you can do
If your doctor has identified household allergens as a source of your symptoms, he or she may recommend medication or immunization.
But doctors agree that one of the best ways to prevent allergy symptoms is to reduce allergen exposure as much as possible.
And an effective way to reduce exposure to household allergens is to clean them out of your home.
© 1999 Procter & Gamble
(Inside Panel 4, top Half)
Throughout the House
Dust mites and pet allergens exist throughout every home, but they are especially hard to control in carpeting, upholstered furniture, pillows, mattresses and bed covers.
If possible, choose hardwood, tile and linoleum floors and washable throw rugs rather than carpeting. All carpets trap dust; and vacuuming can actually increase the airborn amount of dust, unless you use special high-filtration bags and high-efficiency particulate absorption (HEPA) filters on your vacuum.
When possible, choose wooden furniture with washable pads rather than upholstered furniture, which can be a home for dust mites and other allergens.
Regularly replace the filter on your forced-air furnace or central air conditioner.
Dust hard surfaces—floors, walls, furniture, window sills, mirrors-frequently with a cloth that attracts and traps dust.
© 1999 Procter & Gamble
(Inside Panel 4, Bottom Half)
In the bedroom
Most of us spend about eight hours a day—or more—in our bedrooms, in close contact with pillows, mattresses and other item that can trap dust mites and other allergens. So controlling dust in the bedroom is more important than anywhere else in the home.
Encase pillows, mattresses and box springs in airtight, zippered covers. Tape over the zippers for extra dust protection.
Wash all bed linens—sheets, blankets, comforters, pillowcases, mattress pads regularly
Choose pillows and comforters made with synthetic fibers that can be washed rather than down feathers or kapok.
Replace pillows every one or two years.
Cover forced-air heating and cooling vents with disposable HEPA filters.
A room air conditioner can prevent high heat and humidity, which stimulate dust mite growth. In cooler weather, a dehumidifier can help
Keep drawers and closet doors closed.
Dust hard surfaces—floors, walls, furniture, window sills, mirrors—frequently with a cloth that attracts and traps dust.
© 1999 Procter & Gamble
(Inside Panel 5)
SWIFFER can help
Don't just move it. Remove it.
SWIFFER is a new way to remove everyday household soil from your home—including common allergens from dust mites and animal dander.
SWIFFER combines a lightweight sweeper and disposable cloths to trap dust, dirt, hair and common allergens on contact instead of stirring them up.
When you wipe a floor or other hard surface with SWIFFER, it creates an electrostatic charge that attracts dirt and allergens to the cloth. Used alone or on the sweeper, SWIFFER cloths use Lift & Lock Pockets™ to trap and hold all kinds of stuff in place—without leaving any residue on the surface.
When you're finished cleaning, simply throw the SWIFFER cloth away—and all the dirt and allergens go with it.
SWIFFER is more effective at removing common allergens than ordinary cleaning.
Independent testing proves it.
Cat allergen
SWIFFER picks up over 93%
A standard broom picks up less than 16%
A standard dust mop picks up less than 13%
Dust mite allergen
SWIFFER picks up over 93%
A standard broom picks up less than 34%
A standard dust mop picks up less than 42%
Dog allergen
SWIFFER picks up over 93%
A standard broom picks up less than 14%
A standard dust mop picks up less than 28%
SWIFFER is available in the household cleaners aisle at stores everywhere.
© 1999 Procter & Gamble
(Coupon Panel)
(Coupon Teaser)
Try SWIFFER in Your Home
The best way to see how SWIFFER picks up dust, dirt, hair and common allergens is to try it in your own home on floors, electronics, furniture and other dry surfaces. Use this coupon to save $1 on a SWIFFER Starter Kit or Refills.
© 1999 Procter & Gamble
(Back Panel)
For More Information
To learn more about allergies and allergy prevention, talk with your doctor or contact:
American Academy of Allergy, Asthma and Immunology
611 East Wells Street
Milwaukee, Wis. 53202
800/822-2762
American College of Allergy, Asthma and Immunology
85 West Algonquin Road, Suite 550
Arlington Heights, Ill. 60005
800/842-7777
Asthma and Allergy Foundation of America 1233 20$^{th}$ Street, NW, Suite 402
Washington, D.C. 20036
800/7-ASTHMA
Allergy & Asthma Network/Mothers of Asthmatics, Inc.
2751 Prosperity Avenue, Suite 150
Fairfax, Va. 22031
800/878-4403
© 1999 Procter & Gamble
What is claimed is:
1. An article of manufacture for removing allergens from a surface comprising:
(a) package
(b) a cleaning sheet having regions of high basis weight and low basis weight, where said high basis weight is from about 30 g/m$^2$ to about 120 g/m$^2$ and said low basis weight is not more than about 80% of said high basis weight, wherein said cleaning sheet is in said package and wherein said cleaning sheet removes at least about 88% of allergens from said surface when said set is used to wipe said surface; and (c) information in association with said package comprising an instruction to remove at least about 88% of allergens from said surface by wiping said surface at least once with said cleaning sheet.

2. An article according to claim 1, wherein said cleaning sheet is a hydroentangled, nonwoven cleaning sheet.

3. An article according to claim 1, wherein said cleaning sheet comprises an additive selected from the group consisting of a wax, an oil, and mixtures thereof.

4. An article according to claim 1, wherein said allergens are selected from the group consisting of dust mite allergen, cat allergen, dog allergen, mold allergen, cockroach allergen, pollen allergen, and combinations thereof.

5. An article according to claim 1, wherein said cleaning sheet removes at least about 90% of allergens from said surface when said sheet is used to wipe said surface and wherein said information comprises an instruction to remove at least about 90% of allergens from said surface by wiping said surface at least once with said cleaning sheet.

6. An article of manufacture for removing allergens from a surface comprising:

(a) a package (b) a cleaning sheet having regions of high basis weight and low basis weight, wherein said high basis weight is from about 30 g/m$^2$ to about 120 g/m$^2$ and said low basis weight is not more than about 80% of said high basis weight, wherein said cleaning sheet is in said package and wherein said cleaning sheet removes relatively more allergens from said surface as compared to traditional cleaning devices when said sheet is used to wipe said surface; and (c) information in association with said package comprising an instruction to remove relatively more allergens from a surface as compared to traditional cleaning devices, by wiping said surface at least once with said cleaning sheet.

7. An article according, to claim 6, wherein said cleaning sheet is a hydroentangled, nonwoven cleaning sheet.

8. An article according to claim 6, wherein said cleaning sheet comprises an additive selected from the group consisting of a wax, an oil, and mixtures thereof.

9. An article according to claim 6, wherein said allergens are selected from the group consisting of dust mite allergen, cat allergen, dog allergen, mold allergen, cockroach allergen, pollen allergen, and combinations thereof.

10. An article according to claim 6, wherein said cleaning sheet removes at least about 89% of allergens from said surface when said she is used to wipe said surface and wherein said information further comprises an instruction to remove at least about 88% of allergens from said surface by wiping said surface at least once with said cleaning sheet.

11. An article according to claim 6, wherein said traditional cleaning device is selected from the group consisting of a broom, a dust mop, and combinations thereof.

12. An article of manufacture for removing allergens from a surface comprising:

(a) a package;

(b) a cleaning sheet having regions of high basis weight and low basis weight, wherein said high basis weight is from about 30 g/m$^2$ to about 120 g/m$^2$ and said low basis weight is not more than about 80% of sad high basis weight, wherein said cleaning sheet is in said package and wherein said cleaning sheet removes allergens from said surface when said sheet is used to wipe said surface; and information in association with said package comprising an instruction to use said cleaning sheet in combination with an allergy-related product.

13. An article according to claim 12, wherein said cleaning sheet is a hydroentangled, nonwoven cleaning sheet.

14. An article according to claim 12, wherein said cleaning sheet comprises an additive selected from the group consisting of a wax, an oil, and mixtures thereof.

15. An article according to claim 12, wherein said allergens are selected from the group consisting of dust mite allergen, cat allergen, dog allergen, mold allergen, cockroach allergen, and combinations thereof.

16. An article according to claim 12, wherein said cleaning sheet removes at least about 88% of allergens from said surface when said sheet is used to wipe said surface and wherein said information further comprises an instruction to remove at least about 88% of allergens from said surface by wiping said surface at least once with said cleaning sheet.

17. An article according to claim 12, wherein said allergy-related product is selected from the group consisting of: non-prescription drugs; prescription drugs; products that control and/or kill the sources of allergens; air filters; HEPA filters; vacuums; air purification devices; air pollution monitors; books; face masks for filtering air; water filters; household cleaning products; personal cleansing products for either humans and/or animals; and combinations thereof.

* * * * *